United States Patent [19]
Abe et al.

[11] Patent Number: 5,824,621
[45] Date of Patent: *Oct. 20, 1998

[54] EXHAUST GAS CLEANER

[75] Inventors: Akira Abe; Kiyohide Yoshida; Gyo Muramatsu; Satoshi Sumiya; Naoko Irite; Mika Saito, all of Kumagaya, Japan

[73] Assignee: Kabushiki Kaisha Riken, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 495,029

[22] Filed: Jun. 27, 1995

Related U.S. Application Data

[62] Division of Ser. No. 360,025, Dec. 20, 1994, abandoned.

[30] Foreign Application Priority Data

| Dec. 28, 1993 | [JP] | Japan | 5-350492 |
| Dec. 28, 1993 | [JP] | Japan | 5-350657 |
| Mar. 31, 1994 | [JP] | Japan | 6-085770 |
| Mar. 31, 1994 | [JP] | Japan | 6-085790 |
| May 11, 1994 | [JP] | Japan | 6-121914 |
| May 11, 1994 | [JP] | Japan | 6-121925 |
| Jun. 4, 1994 | [JP] | Japan | 6-092955 |
| Oct. 2, 1994 | [JP] | Japan | 6-037864 |

[51] Int. Cl.$^6$ .................................................. B10J 23/00
[52] U.S. Cl. .......................... 502/305; 502/312; 502/347; 502/330; 502/339; 502/311; 502/313; 502/353
[58] Field of Search ................................. 502/347, 305, 502/321, 324, 313, 317, 330, 339, 344, 349, 325, 353, 311, 312

[56] References Cited

U.S. PATENT DOCUMENTS

| 3,454,355 | 7/1969 | Ryason | 423/239.1 |
| 3,931,050 | 1/1976 | Asano et al. | 502/330 |
| 3,956,188 | 5/1976 | Hindin et al. | 252/465 |
| 4,237,032 | 12/1980 | Evans et al. | 252/462 |
| 5,208,202 | 5/1993 | Muramatsu et al. | 502/302 |
| 5,318,760 | 6/1994 | Subramanian et al. | 423/239.2 |
| 5,371,056 | 12/1994 | Leyrer et al. | 502/66 |
| 5,409,681 | 4/1995 | Kato et al. | 502/305 |

FOREIGN PATENT DOCUMENTS

| 0 286 967 | 4/1988 | European Pat. Off. . |
| 0 459 396 | 5/1991 | European Pat. Off. . |
| 0 577 438 | 1/1994 | European Pat. Off. . |
| 40 08 371 | 9/1990 | Germany . |
| 63-100919 | 5/1988 | Japan . |
| 63-283727 | 11/1988 | Japan . |
| 1130735 | 5/1989 | Japan . |
| 4281844 | 10/1992 | Japan . |

OTHER PUBLICATIONS

"Catalytic Cracking of Nitrogen Oxide Over Copper Zeolite(2)", *Japan Chemical Soc.*, Thesis 24526, The 59th Spring Conference (1990).

"Development of Catalytic Removal Method of Nitrogen Oxide in Presence of $SO_x$", *Japan Chemical Soc.*, Thesis 3L420, The 60th Fall Conference (1990).

"Selective Reduction of Nitrogen Oxide by Hydrocarbons (1): Investigation of Zeolite Catalysts", *Japan Chemical Soc.*, Thesis 3L422, The 60th Fall Conference (1990).

"Selective Reduction of Nitrogen Oxide by Hydrocarbons (2): Investigation of Oxide Catalysts" *Japan Chemical Soc.*, Thesis 3L423, The 60th Fall Conference (1990).

"Selective Catalytic Recution of Nitrogen Oxides with Hydrocarbons", *Catalyst*, vol. 33, No. 2, 67th CATSJ Meeting Abstracts: No. A1 pp. 59–60, (1991).

Keenan et al., "General College Chemistry", fifth edition, 1957, pp. 488–489, Harper & Row Publishers.

Abstract of Japanese Application 05 115 788, 14 May 1993.

*Primary Examiner*—David A. Simmons
*Assistant Examiner*—Linda L. Gray
*Attorney, Agent, or Firm*—Browdy and Neimark

[57] ABSTRACT

An exhaust gas cleaner being constituted by a first catalyst of a first porous inorganic oxide supporting a silver component in combination with a W component and a second catalyst of a second porous inorganic oxide supporting a Pt component and optionally a W component. The Ag component may include Ag and compounds thereof, the Pt component may include Pt, Pd, Ru, Rh, Ir, and Au, and the W component may include W, V, Mn, Mo, Nb, and Ta. The W component effectively catalyzes the reduction of nitrogen oxides by ammonia to enhance the removal efficiency of the exhaust gas cleaner.

6 Claims, No Drawings

EXHAUST GAS CLEANER

This is a divisional of parent application Ser. No. 08/360,025, filed Dec. 20, 1994, now abandoned.

BACKGROUND OF THE INVENTION

The present invention relates to an exhaust gas cleaner for effectively removing nitrogen oxides by reduction from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" (NOx) means nitrogen monoxide and/or nitrogen dioxide.

The nitrogen oxides are one of the causes of acid rain, posing a serious problem of environmental pollution. For these reasons, various methods have been proposed to remove nitrogen oxides from exhaust gases emitted from various types of combustion equipment.

In the case of large, stationary combustion apparatuses such as large combustion apparatuses of factories, ammonia is introduced into an exhaust gas, whereby nitrogen oxides in the exhaust gas are catalytically and selectively reduced (a selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide or hydrocarbons (a non-selective catalytic reduction). However, this method requires a larger amount of the reducing agent than its stoichiometric amount relative to oxygen in the exhaust gas to carry out effective removal of NOx. Accordingly, this method is effective only for the exhaust gas having a relatively low oxygen concentration, which is generated by burning nearly at a theoretical air-fuel ratio.

There have been proposed methods of reducing nitrogen oxides by adding to an exhaust gas a reducing agent in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735; Thesis 2A526, 1990, the 59th Spring Conference of the Japan Chemical Society; Theses 3L420, 3L422 and 3L423, 1990, the 60th Fall Conference of the Japan Chemical Society; and "Catalyst", Vol. 33, No. 2, p.59 (1991)).

However, these methods are effective only in a narrow temperature range of NOx removal. Also, their efficiency of removing nitrogen oxides is extremely low in the case of an actual exhaust gas because it contains about 10% of moisture.

OBJECT AND SUMMARY OF THE INVENTION

Accordingly, an object of the present invention is to provide an exhaust gas cleaner and a method capable of efficiently removing nitrogen oxides by reduction together with residual or unburned components such as carbon monoxide and hydrocarbons by oxidation from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

As a result of intense research in view of the above ojects, the inventors have found that nitrogen oxides are reduced to nitrogen gas accompanied by by-production of ammonia when an organic compound such as ethanol is allow to react with an exhaust gas containing oxygen and nitrogen oxides over a catalyst comprising a porous inorganic oxide supporting an Ag component such as Ag and compounds thereof, or a catalyst comprising a porous inorganic oxide supporting the Ag component in combination with a Pt component such as Pt, Pd, Ru, etc. or a W component such as W, V, Mn, etc. The inventors have further found that nitrogen oxides can be effectively removed in a wide temperature range from an exhaust gas containing about 10% of moisture when the exhaust gas, after introducing thereinto at least one reducing agent of hydrocarbons and oxygen-containing organic compounds having at least two carbon atoms or a fuel containing the reducing agent, is brought into contact at a specified temperature and space velocity with a combined catalyst of such a catalyst as mentioned above with a catalyst, capable of reducing nitrogen oxides by the aid of ammonia as a reducing agent, including a Pt component such as Pt, Pd, Ru, etc. and optionally a W component such as W, V, Mn, etc. The present invention has been completed based on these findings.

Thus, in an aspect of the present invention, there is provided an exhaust gas cleaner which can effectively remove nitrogen oxides by reduction and unburned components of carbon monoxide and hydrocarbons by oxidation from an exhaust gas containing nitrogen oxides and oxygen in an amount larger than its stoichiometric amount relative to the unburned components in the exhaust gas, wherein the exhaust gas cleaner is constituted by a first catalyst comprising a first porous inorganic oxide supporting 0.2–15 weight % of an Ag component alone or in combination with 1 weight % or less of a Pt component or 5 weight % or less of a W component and a second catalyst comprising a second porous inorganic oxide supporting 5 weight % or less of a Pt component and optionally 10 weight % or less of a W component, the weight percentages being expressed by metal basis, at least one of the first and second catalysts containing the W component, the Ag component consisting essentially of at least one of Ag and compounds thereof, the Pt component of the first and second catalysts consisting essentially of at least one of Pt, Pd, Ru, Rh, Ir and Au, and the W component of the first and second catalysts consisting essentially of at least one of W, V, Mn, Mo, Nb and Ta,.

In another aspect of the present invention, there is provided a method for removing nitrogen oxides by reduction and unburned components of carbon monoxide and hydrocarbons by oxidation from an exhaust gas containing nitrogen oxides and oxygen in an amount larger than its stoichiometric amount relative to the unburned components in the exhaust gas, which comprises (1) disposing the exhaust gas cleaner mentioned above in a flow path of the exhaust gas, (2) introducing into the exhaust gas at least one reducing agent of hydrocarbons and oxygen-containing organic compounds having at least two carbon atoms or a fuel containing at least one of the reducing agents on an upstream side of the exhaust gas cleaner, and (3) bringing the exhaust gas into contact with the exhaust gas cleaner at a temperature of 150°–650° C., thereby causing a reaction of the nitrogen oxides with the reducing agent to remove the nitrogen oxides and unburned components of carbon monoxide and hydrocarbons by oxidation from the exhaust gas.

DETAILED DESCRIPTION OF THE INVENTION

The preferred embodiments of the present invention include the following types of exhaust gas cleaners and the corresponding methods for removing nitrogen oxides using such exhaust gas cleaners.

(1) First catalyst: Ag component, Second catalyst: Pt component and W component;
(2) First catalyst: Ag component and W component, Second catalyst: Pt component,
(3) First catalyst: Ag component and W component, Second catalyst: Pt component and W component
(4) First catalyst: Ag component and Pt component, Second catalyst: Pt component and W component In the present invention, an exhaust gas is mixed with a reducing agent on an upstream side of the exhaust gas cleaner disposed in a flow path of the exhaust gas. The reducing agent may be hydrocarbons and/or oxygen-containing organic compounds having at least two carbon atoms. A fuel containing such reducing agent may be mixed with the exhaust gas.

The exhaust gas thus mixed with the reducing agent is then brought into contact with the exhaust gas cleaner to remove the nitrogen oxides by reduction and unburned components by oxidation.

The exhaust gas cleaner of the present invention comprises the first catalyst and the second catalyst. The first catalyst is preferred to be disposed on an inlet side of the exhaust gas cleaner and the second catalyst on an outlet side of the exhaust gas cleaner. Such arrangement of the catalysts ensures an effective removal of the nitrogen oxides by reduction in a wide temperature range.

The exhaust gas cleaner of the present invention may be basically in two forms. The exhaust gas cleaner of a first preferred form is obtained by coating on a cleaner substrate the first and second catalyst each comprising a powdery porous inorganic oxide carrying one or more catalytically active components. The exhaust gas cleaner of such a form may be also obtained by coating the catalytically active components onto a porous inorganic oxide powder coated on a cleaner substrate.

Preferable materials for the cleaner substrate include porous, heat-resistant ceramics having a large specific surface area such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the cleaner substrate may be formed from a known metal material.

The shape and size of the cleaner substrate may be changed depending on applications. Practically, the cleaner substrate may be fabricated from two parts or more such as an inlet portion, an intermediate portion, an outlet portion, etc. The cleaner substrate may be of a three-dimensional structure such as a honeycomb, a foam, a refractory fiber assembly, etc. Further, the cleaner substrate may be of granules or pellets. The first and second catalysts may be coated on different portions of one cleaner substrate. Alternatively, the first and second catalysts may be coated on separate cleaner substrates, and thereafter, fabricated into an exhaust gas cleaner.

The exhaust gas cleaner of a second preferred form may be produced by charging into a suitable reactor such as a catalytic converter the first and second catalysts obtained by carrying one or more catalytically active components on a pelletized, granular or powdery porous inorganic oxide, or obtained by forming a porous inorganic oxide carrying one or more catalytically active components into pellet, granule or powder.

The exhaust gas cleaner of the present invention is constituted by the following first and second catalysts.

[A] First catalyst

The first catalyst comprises a first porous inorganic oxide supporting an Ag component alone or in combination with a Pt component or a W component.

[A-1] First porous inorganic oxide

Preferable materials for the first porous inorganic oxide include porous ceramics such as alumina, silica, titania, zirconia and their composite oxides, etc. Particularly preferable materials for the first porous inorganic oxide are γ-alumina or alumina-based composite oxides containing at least one of silica, titania and zirconia. The content of the alumina in the alumina-based composite oxides is preferred to be 50 weight % or more. An alumina content lower than 50 weight % results in a deteriorated initial efficiency of nitrogen oxides removal. The γ-alumina and alumina-based composite oxides promote the reaction of the nitrogen oxides with the reducing agent such as hydrocarbons and oxygen-containing organic compound or a fuel containing the reducing agent. In particular, the alumina-based composite oxides can improve the durability and heat resistance of the exhaust gas cleaner even in the presence of $SO_2$ gas, and further, prevent the oxidation of $SO_2$.

Specific surface areas of the first and second porous inorganic oxides are preferably 10 $m^2/g$ or more. When the specific surface area is smaller than 10 $m^2/g$, the catalytically active component supported on the first porous inorganic oxide does not come into contact with the exhaust gas in a large contact area, failing to remove nitrogen oxides efficiently. The specific surface area of the first porous inorganic oxide is more preferably 30 $m^2/g$ or more.

[A-2] Ag component

The Ag component is one or more of Ag and compounds thereof. The compounds of Ag include oxides, halides such as chlorides, etc. and sulfates of Ag. Preferable Ag component is one or more of Ag, Ag oxides and Ag chlorides.

The average diameter, determined arithmetically, of the Ag component after calcination is preferably 10–10000 nm. Generally the smaller the average diameter of the Ag component, the higher the activity of the first catalyst. However, when the average diameter of the Ag component is less than 10 nm, hydrocarbons and/or oxygen-containing organic compounds are likely to be predominantly oxidized, resulting in a decrease in the removal ratio of the nitrogen oxides. On the other hand, when the average diameter is larger than 10000 nm, the catalytic activity of the Ag component becomes low, resulting in a low removal ratio of the nitrogen oxides. The average diameter of the silver salt component is more preferably 20–2000 nm.

The amount of the Ag component supported on the first porous inorganic oxide is 0.2–15 weight %, preferably 0.5–15 weight % (on a metal basis) based on the first porous inorganic oxide. When the amount of the Ag component is less than 0.2 weight %, the removal ratio of the nitrogen oxides is low. On the other hand, when the amount of the Ag component is more than 15 weight %, the hydrocarbons and oxygen-containing organic compounds are likely to be predominantly burned, resulting in a decrease in the removal ratio of nitrogen oxides.

[A-3] W component

The W component is one or more of W, V, Mn, Mo, Nb and Ta, preferably one or more of W, V, Mo and Mn, and more preferably W and/or V. The W component may include oxides of such elements.

The amount of the W component supported on the first porous inorganic oxide is up to 5 weight %, preferably 0.01–3 weight % (on a metal basis) based on the first porous inorganic oxide. The amount of the W component more than 5 weight % gives no additional effect in improving the removal ratio of the nitrogen oxides. The W component makes it possible to remove the nitrogen oxides by the reducing action of ammonia.

[A-4] Pt component

The Pt component is one or more of Pt, Pd, Ru, Rh, Ir and Au, preferably one or more of Pt, Pd, Ru, Rh and Au, and more preferably one or more of Pt, Pd and Au. The Pt component may include oxides of such elements.

The amount of the Pt component supported on the first porous inorganic oxide is up to 1 weight %, preferably 0.001–0.5 weight %, and more preferably 0.001–0.1 weight % (on a metal basis) based on the first porous inorganic oxide. The amount of the Pt component more than 1 weight % disadvantageously decreases the removal efficiency of the Ag component.

[A-5] Preparation of the first catalyst

The first catalyst is prepared by carrying on the first porous inorganic oxide the Ag component alone or in combination with the W component or Pt component in a manner described below.

The catalytically active components of the first catalyst may be carried by the first porous inorganic oxide by known methods such as impregnation, precipitation, etc. For example, the first porous inorganic oxide is impregnated with an aqueous mixed solution of ammonium salts, oxalates, sulfates, carbonates, nitrates, chlorides, etc. of the elements to be carried, or successively impregnated with an aqueous solution of each element to be carried. For example, the Ag component may be carried by immersing a first porous inorganic oxide into an aqueous solution of silver nitrate, silver sulfate, etc. When silver chloride is intended to be carried, the first porous inorganic oxide impregnated with an aqueous solution of silver nitrate, silver sulfate, etc. is further immersed in an aqueous solution of ammonium chloride to precipitate silver chloride. The Pt component may be carried by immersing a first porous inorganic oxide into an aqueous solution of chloroplatinic acid, chloroauric acid, palladium chloride, etc. The W component may be carried by immersing a first porous inorganic oxide into an aqueous solution of an ammonium salt of tungstic acid, vanadic acid, molybdic acid, etc. in the presence of oxalic acid, etc. The first porous inorganic oxide thus impregnated is dried at 50°–150° C., preferably at about 70° C. The dried material is then heated while elevating the temperature stepwise from 100° C. to 600° C. to be calcined in air, oxygen-containing atmosphere, nitrogen atmosphere or hydrogen stream. When the heating is conducted in a nitrogen atmosphere or in a hydrogen stream, it is preferable to finally conduct an oxidation treatment at 300°–650° C.

The first and second catalyst may be carried by the cleaner substrate as described above by known methods such as a wash-coating method, a powder method, etc. The thickness of the first catalyst carried by the cleaner substrate is preferably up to 300 μm, more preferably up to 200 μm, though it is usually restricted by the difference in a thermal expansion coefficients between the first catalyst and the cleaner substrate. With this thickness, it is possible to prevent the cleaner from being broken by a thermal shock, etc. during NOx-removing operations.

The amount of the first catalyst coated onto a surface of the cleaner substrate is preferably 20–300 g/liter, more preferably 50–250 g/liter based on the cleaner substrate. When the amount of the first catalyst is less than 20 g/liter, a sufficient removal ratio of the nitrogen oxides cannot be achieved. On the other hand, an amount more than 300 g/liter gives no detectable increase in removal efficiency, but results in a higher loss of pressure.

[B] Second catalyst

The second catalyst comprises a second porous inorganic oxide supporting a Pt component or a W component.

[B-1] Second porous inorganic oxide

Preferable materials for the second porous inorganic oxide include porous, heat-resistant ceramics having a large specific surface area such as titania, alumina, zirconia, silica, and their composite oxides. Particularly preferable materials for the second porous inorganic oxide are titania and composite oxides containing titania.

[B-2] W component

The W component is one or more of W, V, Mn, Mo, Nb and Ta, preferably one or more of W, V, Mo and Mn, and more preferably W and/or V. The W component may include oxides of such elements.

The amount of the W component supported on the second porous inorganic oxide is up to 10 weight %, preferably 0.01–10 weight %, more preferably 0.2–8 weight %, and particularly preferably 0.5–5 weight % (on a metal basis) based on the second porous inorganic oxide. The amount of the W component more than 10 weight % gives no additional effect in improving the removal ratio of the nitrogen oxides. The W component makes it possible to remove the nitrogen oxides by the reducing action of ammonia.

[B-3] Pt component

The Pt component is one or more of Pt, Pd, Ru, Rh, Ir and Au, preferably one or more of Pt, Pd, Ru, Rh and Au, and more preferably one or more of Pt, Pd and Au. The Pt component may include oxides of such elements.

The amount of the Pt component supported on the second porous inorganic oxide is up to 5 weight %, preferably 0.01–5 weight %, and more preferably 0.1–4 weight % (on a metal basis) based on the second porous inorganic oxide. The amount of the Pt component more than 5 weight % disadvantageously decreases the removal efficiency of the Ag component.

The Pt component may further contain known oxidation catalysts, alkaline earth metals, rare earth metals, etc. to improve the durability of the Pt component.

[B-4] Preparation of the second catalyst

The second catalyst is prepared by carrying on the second porous inorganic oxide the Pt component alone or in combination with the W component in the same manner as in the preparation of the first catalyst.

A weight ratio of the first catalyst to the second catalyst is 10:1 to 1:2, preferably 9:1 to 1:1. When the weight is less than 1:2 (when the percentage of the first catalyst is too small), a sufficiently high removal ratio of the nitrogen oxides cannot be achieved in a wide temperature range of 150°–650° C. On the other hand, when the weight ratio is higher than 10:1 (when the percentage of the first catalyst is too large), the ammonia generated on the first catalyst is exhausted without reacting with the nitrogen oxides to increase the ammonia content in the exhaust gas.

With the exhaust gas cleaner described above, the nitrogen oxides in an exhaust gas containing about 10% of moisture can be effectively removed in a wide temperature range of 150–°650° C. The ammonia generated on the first catalyst preferentially reacts with nitrogen dioxide to reduce the content of harmful nitrogen dioxide in the exhaust gas. In particular, the exhaust gas cleaner of the present invention shows high removal of nitrogen oxides, carbon monoxide and hydrocarbons even in a low temperature range, e.g., 150°–350° C. when the exhaust gas contain a small amount (5 ppm or less) or substantially no sulfur oxides

[C] Method for removing NOx

The exhaust gas cleaner is disposed in a flow path of the exhaust gas, with the first catalyst on the inlet side and the second catalyst on the outlet side.

The exhaust gas usually contains residual hydrocarbons such as ethylene, propylene, etc. to some extent. Since the exhaust gas generally does not contain sufficient amounts of residual hydrocarbons to reduce all nitrogen oxides in the exhaust gas, at least one reducing agent should be introduced into the exhaust gas. A site for introducing the reducing agent is an upstream side of the exhaust gas cleaner.

The reducing agent includes hydrocarbons and oxygen-containing organic compounds having at least two carbon atoms. A fuel containing such reducing agent may be used.

The hydrocarbons used as the reducing agent include alkanes, alkenes and alkynes which may be gaseous or liquid in the normal state (25° C. 1 atm). The gaseous hydrocarbons may be alkanes, alkenes or alkynes each having 2 or more carbon atoms, such as propane, propylene, acetylene, etc. The liquid hydrocarbons may be heptane, cetane, kerosene, diesel oil, light oil, gasoline, heavy oil, etc. The liquid hydrocarbons preferred to have a boiling point of 50°–350° C.

The oxygen-containing organic compounds having at least two carbon atoms may be alcohols such as ethanol, isopropyl alcohol, etc.

The weight ratio of the reducing agent/nitrogen oxides is preferably 0.1–5, more preferably 0.2–4. When the weight ratio is less than 0.1, the removal ratio of nitrogen oxides is low. On the other hand, when the weight ratio is more than 5, fuel efficiency is low.

The fuel to be introduced into the exhaust gas together with the reducing agent may be gasoline, light oil, kerosene, etc. The fuel containing the reducing agent may be introduced in an amount such that the weight ratio of the reducing agent/nitrogen oxides in the exhaust gas is 0.1–5.

To efficiently reduce the nitrogen oxides with the oxygen-containing organic compounds, hydrocarbons or ammonia, the overall apparent space velocity of the exhaust gas passing through the exhaust gas cleaner is 500,000 $h^{-1}$ or less. An overall apparent space velocity exceeding 500,000 $h^{-1}$ causes insufficient reduction of the nitrogen oxides to result in poor removal ratio of the nitrogen oxides. The preferred overall apparent space velocity is 450,000 $h^{-1}$ or less, and more preferred is 300,000 $h^{-1}$ or less.

The space velocity of the exhaust gas passing through the first catalyst is 200,000 $h^{-1}$ or less, preferably 150,000 $h^{-1}$ or less. A space velocity at the first catalyst exceeding 200,000 $h^{-1}$ causes insufficient reduction of the nitrogen oxides which results in poor removal ratio of the nitrogen oxides.

The space velocity of the exhaust gas passing through the second catalyst is 250,000 $h^{-1}$ or less, preferably 200,000 $h^{-1}$ or less. A space velocity at the second catalyst exceeding 250,000 $h^{-1}$ causes a poor removal of hydrocarbons and carbon monoxide by oxidation. When the exhaust gas contains $SO_2$, the space velocity at the second catalyst is preferred to be 10,000–250,000 $h^{-1}$, because $SO_2$ is likely to be preferentially oxidized when the space velocity is lower than 10,000 $h^{-1}$.

The exhaust gas passing through the exhaust gas cleaner where the reducing agent is reacted with the nitrogen oxides is kept at 150°–650° C., preferably 250°–600° C. When the temperature of the exhaust gas is lower than 150° C., a reduction of the nitrogen oxides by the reducing agent cannot be sufficiently carried out. On the other hand, when the temperature of the exhaust gas is higher than 650° C., the reducing agent is burned, failing to reduce the nitrogen oxides effectively.

The present invention will be described in further detail by way of the following Examples. Incidentally, the catalytic active components are generally expressed by metals themselves for simplicity in the Examples.

EXAMPLE 1

10 g of commercially available γ-alumina pellets (diameter: 1.5 mm, length: 2–3 mm, specific surface area: 260 $m^2/g$) were immersed in an aqueous solution of silver nitrate to carry 4 weight % (metal basis) of Ag based on the γ-alumina pellets. The resultant pellets were dried and heated to 600° C. stepwise in air to be calcined to prepare a first catalyst (Ag).

Separately, 2 g of γ-alumina pellets of the same type as above were immersed in an aqueous solution of chloroplatinic acid to carry 0.2 weight % (metal basis) of Pt, then immersed for 30 minutes in an aqueous solution prepared by heating over a water bath a mixture of 1.8 g of ammonium tungstate para-pentahydrate, 1.0 g of oxalic acid and 6.2 ml of water to further carry 1 weight % (metal basis) of W. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt/W).

An exhaust gas cleaner was obtained by charging into a reactor tube 3 g of the first catalyst on the inlet side and 0.6 g of the second catalyst on the outlet side. Next, a test gas having the composition shown in Table 1 was caused to pass through the reactor pipe at a rate of 4.4 liters per minute (the normal state: 25° C., 1 atm), which corresponded to an overall apparent space velocity of about 30,000 $h^{-1}$. The temperature of the test gas in the reactor tube was maintained at a temperature shown in Table 2 to cause a reaction of nitrogen oxides with ethanol.

TABLE 1

| Component | Concentration |
| --- | --- |
| Nitrogen monoxide | 1000 ppm (dry basis) |
| Carbon dioxide | 10 volume % (dry basis) |
| Oxygen | 10 volume % (dry basis) |
| Ethanol | 1250 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The removal ratio was calculated from the equation: (initial concentration −concentration after passing)/(initial concentration)×100. The results are shown in Table 2.

EXAMPLE 2

In the same manner as in Example 1, γ-alumina powder (specific surface area: 200 m$^2$/g) carrying 4 weight % (metal basis) of Ag was prepared. Then, 1.0 g of the γ-alumina powder thus obtained was coated on a commercially available honeycomb-type cordierite filter (diameter: 30 mm, length: 10 mm, 400 cells/in$^2$), dried and then heated to 600° C. stepwise to calcine the resulting material to prepare a first exhaust gas cleaner part carrying the first catalyst (Ag).

Separately, γ-alumina powder of the same type as above was immersed in an aqueous solution of chloroplatinic acid to carry 0.2 weight % (metal basis) of Pt. Then, the resulting γ-alumina powder was immersed for 30 minutes in an aqueous solution prepared by heating over a water bath a mixture of ammonium vanadate and oxalic acid in 30 ml of water to prepare a slurry. The content of V based on the γ-alumina powder was 1 weight % (metal basis). 0.25 g (dry basis) of the slurry thus obtained was coated on a commercially available honeycomb-type cordierite filter (diameter: 30 mm, length: 2.5 mm). The cordierite filter thus treated was then dried and calcined in the same manner as in Example 1 to prepare a second exhaust gas cleaner part carrying the second catalyst (Pt/V).

With the first cleaner part on the inlet side and the second cleaner part on the outlet side, the two cleaner parts were combined and charged in a reactor pipe. Under the same conditions as in Example 1, tests were conducted using the test gas having the composition shown in Table 1. The results are shown in Table 2.

Comparative Example 1

In the same manner as in Example 1, a catalyst comprising γ-alumina pellets carrying 4 weight % (metal basis) of Ag was prepared. 3.6 g of this catalyst was charged in a reactor pipe to obtain an exhaust gas cleaner. The same tests as in Example 1 were conducted on the exhaust gas cleaner thus obtained. The results are shown in Table 2.

TABLE 2

| | Removal Ratio of Nitrogen Oxides (%) | | |
|---|---|---|---|
| Temp. (°C.) | Ex. 1 | Ex. 2 | Com. Ex. 1 |
| 300 | 60.8 | 68.5 | 50.2 |
| 350 | 75.2 | 80.7 | 65.8 |
| 400 | 85.7 | 90.0 | 75.1 |
| 450 | 80.0 | 90.5 | 70.5 |
| 500 | 65.3 | 70.4 | 60.1 |
| 550 | 60.4 | 64.0 | 50.4 |

As is clear from Table 2, the exhaust gas cleaners of Examples 1 and 2 showed high removal ratios of the nitrogen oxides in a wide temperature range of the exhaust gas. On the other hand, the exhaust gas cleaner of Comparative Example 1 which includes only the Ag component shows a lower removal ratio of the nitrogen oxides as compared with those of Examples 1 and 2.

EXAMPLE 3

The same exhaust gas cleaner as prepared in Example 1 was evaluated on its removal efficiency by passing through it a test gas having the composition shown in Table 3 which contained propylene as the reducing agent. The test was conducted by passing the test gas at a rate of 4.4 liters per minute (the normal state), which corresponded to an overall apparent space velocity of 30,000 h$^{-1}$ at an exhaust gas temperatures shown in Table 4.

TABLE 3

| Component | Concentration |
|---|---|
| Nitrogen monoxide | 800 ppm (dry basis) |
| Carbon monoxide | 100 ppm (dry basis) |
| Oxygen | 10 volume % (dry basis) |
| Propylene | 1714 ppm (dry basis, three times the weight of nitrogen monoxide) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentrations of carbon monoxide and hydrocarbons were measured by a CO-meter and HC-meter to determine the removal ratio of carbon monoxide and hydrocarbons. The results are shown in Table 4.

EXAMPLE 4

The same exhaust gas cleaner as prepared in Example 2 was evaluated on its removal efficiency in the same manner as in Example 3. The results are shown in Table 4.

Comparative Example 2

The same exhaust as cleaner prepared in Comparative Example 1 was evaluated in its removal efficiency in the same manner as in Example 3. The results are shown in Table 4.

TABLE 4

Removal Ratios of Nitrogen Oxides (NOx), Carbon Monoxide (CO) and Hydrocarbons (HC)

| Temperature | Removed | Removal Ratio (%) | | |
|---|---|---|---|---|
| (°C.) | Components | Ex. 3 | Ex. 4 | Com. Ex. 2 |
| 300 | NOx | 5 | 10 | 0 |
|  | CO | 90.5 | 90.8 | 40 |
|  | HC | 66 | 66 | 30 |
| 350 | NOx | 20 | 25 | 0 |
|  | CO | 95.7 | 95.5 | 60 |
|  | HC | 71 | 76 | 35 |
| 400 | NOx | 45 | 50 | 20 |
|  | CO | 100 | 100 | 70 |
|  | HC | 96 | 95 | 40 |
| 450 | NOx | 65 | 70 | 60 |
|  | CO | 100 | 100 | 70 |
|  | HC | 98 | 98 | 65 |
| 500 | NOx | 60 | 65 | 55 |
|  | CO | 100 | 100 | 80 |
|  | HC | 100 | 100 | 70 |
| 550 | NOx | 35 | 50 | 25 |
|  | CO | 100 | 100 | 90 |
|  | HC | 100 | 100 | 85 |
| 600 | NOx | 20 | 25 | 10 |
|  | CO | 100 | 100 | 98 |
|  | HC | 100 | 100 | 90 |

As is clear from Table 4, the exhaust gas cleaners of Examples 3 and 4 showed high removal ratios of nitrogen oxides and hydrocarbons in a wide temperature range of the exhaust gas. In addition, the exhaust gas cleaners of Examples 3 and 4 showed an excellent removal ratio of carbon monoxide higher than 90%. On the other hand, the exhaust gas cleaner of Comparative Example 2 which included the Ag component alone was effective for removal of nitrogen oxides in only a narrow temperature range of the exhaust gas, and showed poor removal ratios of carbon monoxide and hydrocarbons.

EXAMPLE 5

10 g of commercially available silica-alumina powder ($SiO_2$ content: 5 weight %, specific surface area: 350 $m^2/g$) was dispersed in an aqueous solution of silver nitrate to carry 4 weight % (metal basis) of Ag based on the silica-alumina powder. The resultant powder was then dried and heated to 600° C. stepwise in air to be calcined. The powder thus treated was formed into pellets (diameter: 1.5 mm, length: 2–3 mm) to obtain a first catalyst (Ag).

Separately, 2 g of titania pellets (diameter: 1.5 mm, length: 2–3 mm, specific surface area: 350 $m^2/g$) were immersed in an aqueous solution of chloroplatinic acid to carry 1 weight % (metal basis) of Pt, then immersed for 30 minutes in an aqueous solution prepared by heating over a water bath a mixture of ammonium vanadate, oxalic acid and water to further carry 3 weight % (metal basis) of V. The titania pellets thus treated were dried in an air at 80° C. for 2 hours, at 100° C. for 2 hours and then at 120° C. for 2 hours. The dried titania pellets were then heated from 120° C. to 500° C. in a nitrogen stream containing 20 % of oxygen over 5 hours and calcined at 500° C. for 4 hours to prepare a second catalyst (Pt/V).

An exhaust gas cleaner was obtained by charging into a reactor tube 3.6 g of the first catalyst on the inlet side and 1.2 g of the second catalyst on the outlet side. Next, a test gas having the composition shown in Table 5 was caused to pass through the reactor pipe at a rate of 4.4 liters per minute (the normal state), which corresponded to an apparent space velocity at the first catalyst of about 30,000 $h^{-1}$, and an apparent space velocity at the second catalyst of about 100,000 $h^{-1}$. The temperature of the test gas in the reactor tube was maintained at a temperature shown in Table 6 to cause a reaction of nitrogen oxides with ethanol.

TABLE 5

| Component | Concentration |
| --- | --- |
| Nitrogen monoxide | 800 ppm (dry basis) |
| Oxygen | 10 volume % (dry basis) |
| Carbon monoxide | 100 ppm (dry basis) |
| Ethanol | three times the weight of nitrogen monoxide (dry basis) |
| Propylene | 100 ppm (dry basis) |
| Sulfur dioxide | 80 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentration of carbon monoxide, sulfur dioxide and hydrocarbon (propylene) were measured by a CO-meter, SOx-meter and HC-meter to determine each removal ratio of carbon monoxide and hydrocarbon and the oxidation ratio of sulfur dioxide. However, the removal ratios of carbon monoxide and hydrocarbon were determined on the test gas containing no ethanol. The results are shown in Table 6.

EXAMPLE 6

In the same manner as in Example 5, silica-alumina powder carrying 4 weight % (metal basis) of Ag was prepared. Then, 1.0 g of the silica-alumina powder thus obtained was coated on a commercially available honeycomb-type cordierite filter (diameter: 30 mm, length: 12.5 mm, 400 cells/$in^2$), dried and then heated to 600° C. stepwise to calcine the resulting material to prepare a first exhaust gas cleaner part carrying the first catalyst (Ag).

Separately, titania powder (specific surface area: 50 $m^2/g$) was dispersed in an aqueous solution of chloroplatinic acid to carry 1 weight % (metal basis) of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % (metal basis) of W. 0.4 g (dry basis) of the slurry thus obtained was coated on a commercially available honeycomb-type cordierite filter (diameter: 30 mm, length: 4.2 mm). The cordierite filter thus treated was then dried and calcined in the same manner as in Example 5 to prepare a second exhaust gas cleaner part carrying the second catalyst (Pt/W).

With the first cleaner part on the inlet side and the second cleaner part on the outlet side, the two cleaner parts were combined and charged in a reactor pipe. Under the same conditions as in Example 5, tests were conducted using the test gas having the composition shown in Table 5 (apparent space velocity at the first catalyst: about 30,000 $h^{-1}$, apparent space velocity at the second catalyst: about 90,000 $h^{-1}$). The results are shown in Table 6.

EXAMPLE 7

In the same manner as in Example 6, a first exhaust gas cleaner part carrying a first catalyst (Ag) was prepared. Further, in the same manner as in Example 6, a second exhaust gas cleaner part carrying a second catalyst (Pt/W/V) was obtained by coating titania powder carrying 1 weight % of Pt, 2 weight % of W and 3 weight % of V, each based on metal basis, on a commercially available honeycomb-type cordierite filter.

With the first cleaner part on the inlet side and the second cleaner part on the outlet side, the two cleaner parts were combined and charged in a reactor pipe. Under the same conditions as in Example 5, tests were conducted using the test gas having the composition shown in Table 5 (apparent space velocity at the first catalyst: about 30,000 $h^{-1}$, apparent space velocity at the second catalyst: about 90,000 $h^{-1}$). The results are shown in Table 6.

Comparative Example 3

In the same manner as in Example 5, a catalyst comprising silica-alumina pellets carrying 4 weight % (metal basis) of Ag was prepared. 3.6 g of this catalyst was charged in a reactor pipe to obtain an exhaust gas cleaner. Tests were conducted under the same conditions as in Example 5 (overall apparent space velocity: about 30,000 $h^{-1}$). The results are shown in Table 6.

TABLE 6

Removal Ratios of Nitrogen Oxides (NOx),
Carbon Monoxide (CO) and Hydrocarbons (HC), and
Oxidation Ratio of Sulfur Dioxide ($SO_2$)

| Temperature (°C.) | Removed Components | Removal Ratio and Oxidation Ratio (%) | | | |
|---|---|---|---|---|---|
| | | Ex. 5 | Ex. 6 | Ex. 7 | Com. Ex. 3 |
| 250 | NOx | 18 | 15 | 20 | 12 |
| | CO | 80 | 75 | 70 | 15 |
| | HC | 50 | 45 | 50 | 10 |
| | $SO_2$ | — | — | — | — |
| 300 | NOx | 50 | 48 | 55 | 30 |
| | CO | 90 | 89 | 88 | 40 |
| | HC | 65 | 65 | 68 | 32 |
| | $SO_2$ | — | — | — | — |
| 350 | NOx | 70 | 65 | 72 | 50 |
| | CO | 95 | 95 | 95 | 60 |
| | HC | 70 | 70 | 70 | 32 |
| | $SO_2$ | — | — | — | — |
| 400 | NOx | 85 | 88 | 82 | 60 |
| | CO | 100 | 100 | 100 | 70 |
| | HC | 95 | 95 | 94 | 40 |
| | $SO_2$ | 5 | 5 | 5 | — |
| 450 | NOx | 78 | 80 | 74 | 70 |
| | CO | 100 | 100 | 100 | 70 |
| | HC | 98 | 98 | 96 | 65 |
| | $SO_2$ | 7 | 7 | 7 | — |
| 500 | NOx | 70.5 | 74 | 72 | 60.2 |
| | CO | 100 | 100 | 100 | 80 |
| | HC | 100 | 100 | 100 | 70 |
| | $SO_2$ | 12 | 12 | 12 | — |
| 550 | NOx | 50.5 | 55 | 52.1 | 52 |
| | CO | 100 | 100 | 100 | 90 |
| | HC | 100 | 100 | 100 | 85 |
| | $SO_2$ | 15 | 15 | 15 | — |
| 600 | NOx | 10 | 20 | 15 | 20 |
| | CO | 100 | 100 | 100 | 98 |
| | HC | 100 | 100 | 100 | 90 |
| | $SO_2$ | 20 | 20 | 20 | — |

As seen from Table 6, the exhaust gas cleaners of Examples 5–7 showed high removal ratio of the nitrogen oxides in a wide temperature range as well as high removal ratios of carbon monoxide and hydrocarbons even in a lower temperature range. In addition, the use of alumina-based composite oxide prevented $SO_2$ from being preferentially oxidized. Thus, the exhaust gas cleaner of Examples 5–7 showed removal efficiency superior to that of Comparative Example 3.

EXAMPLE 8

10 g of commercially available γ-alumina pellets (diameter: 1.5 mm, length: 2–3 mm, specific surface area: 260 m²/g) were immersed in an aqueous solution of silver nitrate, and dried at 80° C. for 2 hours in air and 180° C. for 2 hours in dry nitrogen stream. After cooling to room temperature in dry nitrogen stream, the γ-alumina pellets thus obtained were then immersed in an aqueous solution of ammonium chloride (0.5 g ammonium chloride in 20 ml water) for 12 hours to convert the silver nitrate on the γ-alumina pellets into the silver chloride precipitate, thereby obtaining the γ-alumina pellets carrying 4 weight % (metal basis) of silver chloride. The γ-alumina pellets thus obtained were dried and heated to 600° C. stepwise in air to be calcined to prepare a first catalyst (AgCl).

Separately, 2 g of γ-alumina pellets of the same type as above were immersed in an aqueous solution of chloroplatinic acid to carry 0.2 weight % (metal basis) of Pt, then immersed for 30 minutes in an aqueous solution prepared by heating over a water bath a mixture of 1.8 g of ammonium tungstate para-pentahydrate, 1.0 g of oxalic acid and 6.2 ml of water to further carry 1 weight % (metal basis) of W. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt/W).

An exhaust gas cleaner was obtained by charging into a reactor tube 3 g of the first catalyst on the inlet side and 0.6 g of the second catalyst on the outlet side. Next, a test gas having the composition shown in Table 1 was caused to pass through the reactor pipe at a rate of 4.4 liters per minute (the normal state), which corresponded to an overall apparent space velocity of about 30,000 h$^{-1}$. The temperature of the test gas in the reactor tube was maintained at a temperature shown in Table 7 to cause a reaction of nitrogen oxides with ethanol.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in Table 7.

EXAMPLE 9

In the same manner as in Example 8, γ-alumina powder (specific surface area: 200 m²/g) carrying 4 weight % (metal basis) of AgCl was prepared. Then, 1.0 g of the γ-alumina powder thus obtained was coated on a commercially available honeycomb-type cordierite filter (diameter: 30 mm, length: 10 mm, 400 cells/in²), dried and then heated to 600° C. stepwise to calcine the resulting material to prepare a first exhaust gas cleaner part carrying the first catalyst (AgCl).

Separately, γ-alumina powder of the same type as above was immersed in an aqueous solution of chloroplatinic acid to carry 0.2 weight % (metal basis) of Pt. Then, the resulting γ-alumina powder was immersed for 30 minutes in an aqueous solution prepared by heating over a water bath a mixture of ammonium vanadate and oxalic acid in 30 ml of water to prepare a slurry. The content of V based on the γ-alumina powder was 1 weight % (metal basis). 0.25 g (dry basis) of the slurry thus obtained was coated on a commercially available honeycomb-type cordierite filter (diameter: 30 mm, length: 2.5 mm). The cordierite filter thus treated was then dried and calcined in the same manner as in Example 8 to prepare a second exhaust gas cleaner part carrying the second catalyst (Pt/V).

With the first cleaner part on the inlet side and the second cleaner part on the outlet side, the two cleaner parts were combined and charged in a reactor pipe. Under the same conditions as in Example 8, tests were conducted using the test gas having the composition shown in Table 1. The results are shown in Table 7.

Comparative Example 4

In the same manner as in Example 8, a catalyst comprising γ-alumina pellets carrying 4 weight % (metal basis) of AgCl was prepared. 3.6 g of this catalyst was charged in a reactor pipe to obtain an exhaust gas cleaner. The same tests as in Example 8 were conducted on the exhaust gas cleaner thus obtained. The results are shown in Table 7.

TABLE 7

| Temp. (°C.) | Removal Ratio of Nitrogen Oxides (%) | | |
|---|---|---|---|
| | Ex. 8 | Ex. 9 | Com. Ex. 4 |
| 300 | 60.0 | 65.8 | 50.0 |
| 350 | 73.2 | 77.8 | 64.2 |
| 400 | 85.6 | 89.8 | 73.4 |
| 450 | 83.2 | 85.4 | 72.0 |
| 500 | 68.3 | 72.2 | 63.0 |
| 550 | 62.3 | 68.3 | 3.2 |

As is clear from Table 7, the exhaust gas cleaners of Example 8 and 9 showed high removal ratios of the nitrogen oxides in a wide temperature range of the exhaust gas. On the other hand, the exhaust gas cleaner of Comparative Example 4 which includes only the Ag component shows a lower removal ratio of the nitrogen oxides as compared with those of Examples 8 and 9.

Example 10

10 g of commercially available γ-alumina pellets (diameter: 1.5 mm, length: 2–3 mm, specific surface area: 260 m$^2$/g) were immersed in an aqueous solution of silver nitrate to carry 4 weight % (metal basis) of Ag based on the γ-alumina pellets. The resultant pellets were dried and heated to 600° C. stepwise in air to be calcined. The γ-alumina pellets thus obtained were further immersed in an aqueous solution prepared by heating over a water bath a mixture of ammonium molybdate, oxalic acid and water to further carry 0.06 weight % (metal basis) of Mo. The γ-alumina pellets thus treated were subjected to drying and calcination in the same manner as above to obtain a first catalyst (Ag/Mo).

Separately, 2 g of γ-alumina pellets of the same type as above were immersed in an aqueous solution of chloroplatinic acid to carry 0.2 weight % (metal basis) of Pt. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt).

An exhaust gas cleaner was obtained by charging into a reactor tube 3 g of the first catalyst on the inlet side and 0.6 g of the second catalyst on the outlet side. Next, a test gas having the composition shown in Table 1 was caused to pass through the reactor pipe at a rate of 4.4 liters per minute (the normal state), which corresponded to an overall apparent space velocity of about 30,000 h$^{-1}$. The temperature of the test gas in the reactor tube was maintained at a temperature shown in Table 2 to cause a reaction of nitrogen oxides with ethanol.

TABLE 8

| Component | Concentration |
|---|---|
| Nitrogen monoxide | 800 ppm (dry basis) |
| Carbon dioxide | 10 volume % (dry basis) |
| Oxygen | 10 volume % (dry basis) |
| Ethanol | three times the weight of notrogen monoxide (dry basis) |
| Nitrogen | Balance |
| Water | 10 volume % of the total volume of the above components |

The concentration of nitrogen oxides (sum of nitrogen monoxide and nitrogen dioxide) in the test gas after passing, through the exhaust gas cleaner was measured by a chemiluminescence analyzer to determine the removal ratio of nitrogen oxides. The results are shown in Table 9.

EXAMPLE 11

In the same manner as in Example 10, γ-alumina powder (specific surface area: 200 M$^2$/g) carrying 4 weight % (metal basis) of Ag and 0.06 weight % (metal basis) of Mo was prepared. Then, 1.0 g of the γ-alumina powder thus obtained was coated on a commercially available honeycomb-type cordierite filter (diameter: 30 mm, length: 10 mm, 400 cells/in$^2$), dried and then heated to 600° C. stepwise to calcine the resulting material to prepare a first exhaust gas cleaner part carrying the first catalyst (Ag/Mo).

Separately, γ-alumina powder of the same type as above was dispersed in an aqueous solution of chloroplatinic acid to obtain a slurry of γ-alumina powder carrying 0.2 weight % (metal basis) of Pt. 0.25 g (dry basis) of the slurry thus obtained was coated on a commercially available honeycomb-type cordierite filter (diameter: 30 mm, length: 2.5 mm). The cordierite filter thus treated was then dried and calcined in the same manner as in Example 10 to prepare a second exhaust gas cleaner part carrying the second catalyst (Pt).

With the first cleaner part on the inlet side and the second cleaner part on the outlet side, the two cleaner parts were combined and charged in a reactor pipe. Under the same conditions as in Example 10, tests were conducted using the test gas having the composition shown in Table 8. The results are shown in Table 9.

Comparative Example 5

In the same manner as in Example 10, a catalyst comprising γ-alumina pellets carrying 4 weight % (metal basis) of Ag alone was prepared. 3.6 g of this catalyst was charged in a reactor pipe to obtain an exhaust gas cleaner. The same tests as in Example 10 were conducted on the exhaust gas cleaner thus obtained. The results shown in Table 9.

TABLE 9

| Temp. (°C.) | Removal Ratio of Nitrogen Oxides (%) | | |
|---|---|---|---|
| | Ex. 10 | Ex. 11 | Com. Ex. 5 |
| 250 | 80.0 | 88.0 | 30.0 |
| 300 | 89.8 | 92.5 | 50.2 |
| 350 | 80.2 | 90.0 | 65.8 |
| 400 | 65.0 | 76.0 | 75.1 |
| 450 | 48.0 | 53.5 | 70.5 |
| 500 | 40.3 | 43.4 | 60.1 |
| 550 | 38.4 | 43.0 | 50.4 |

As is clear from Table 9, the exhaust gas cleaners of Examples 10 and 11 showed high removal ratios of the nitrogen oxides in a wide temperature range, in particular, in a lower temperature range of the exhaust gas. On the other hand, the exhaust cleaner of Comparative Example 5 which included the Ag component alone showed a lower removal ratio of the nitrogen oxides as compared with those of Examples 10 and 11.

EXAMPLE 12

The same exhaust gas cleaner as prepared in Example 10 was evaluated on its removal efficiency by passing through it a test gas having the composition shown in Table 10 which contained propylene as the reducing agent. The test was conducted by passing the test gas at a rate of 4.4 liters per minute (the normal state), which corresponded to an overall apparent space velocity of 30,000 h$^{-1}$, exhaust gas temperatures shown in Table 4.

TABLE 10

| Component | Concentration |
| --- | --- |
| Nitrogen monoxide | 800 ppm (dry basis) |
| Carbon monoxide | 100 ppm (dry basis) |
| Oxygen | 10 volume % (dry basis) |
| Propylene | 1714 ppm (dry basis, three times the weight of nitrogen monoxide) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentrations of carbon monoxide and hydrocarbons were measured by a CO-meter and HC-meter to determine the removal ratio of carbon monoxide and hydrocarbons. The results are shown in Table 11.

EXAMPLE 13

The same exhaust gas cleaner as prepared in Example 11 was evaluated on its removal efficiency in the same manner as in Example 12. The results are shown in Table 11.

Comparative Example 6

The same exhaust gas cleaner as prepared in Comparative Example 5 was evaluated on its removal efficiency in the same manner as in Example 12. The results are shown in Table 11.

TABLE 11

Removal Ratios of Nitrogen Oxides (NOx),
Carbon Monoxide (CO) and Hydrocarbons (HC)

| Temperature | Removed | Removal Ratio (%) | | |
| --- | --- | --- | --- | --- |
| (°C.) | Components | Ex. 12 | Ex. 13 | Com. Ex. 6 |
| 300 | NOx | 0 | 5 | 0 |
|  | CO | 90.5 | 90.8 | 40 |
|  | HC | 66 | 66 | 30 |
| 350 | NOx | 10 | 15 | 0 |
|  | CO | 95.7 | 95.5 | 60 |
|  | HC | 71 | 76 | 35 |
| 400 | NOx | 30 | 35 | 20 |
|  | CO | 100 | 100 | 70 |
|  | HC | 96 | 95 | 40 |
| 450 | NOx | 65 | 70 | 60 |
|  | CO | 100 | 100 | 70 |
|  | HC | 98 | 98 | 65 |
| 500 | NOx | 55 | 60 | 55 |
|  | CO | 100 | 100 | 80 |
|  | HC | 100 | 100 | 70 |
| 550 | NOx | 35 | 35 | 25 |
|  | CO | 100 | 100 | 90 |
|  | HC | 100 | 100 | 85 |
| 600 | NOx | 20 | 25 | 10 |
|  | CO | 100 | 100 | 98 |
|  | HC | 100 | 100 | 90 |

As is clear from Table 11, the exhaust gas cleaners of Examples 12 and 13 showed high removal ratios of nitrogen oxides and hydrocarbons over a wide temperature range of the exhaust gas. In addition, the exhaust gas cleaners of Examples 12 and 13 showed an excellent removal ratio of carbon monoxide higher than 90%. On the other hand, the exhaust gas cleaner of Comparative Example 6 which included only the Ag component was effective for removal of nitrogen oxides over only a narrow temperature range of the exhaust gas, and showed poor removal ratios of carbon monoxide and hydrocarbons.

EXAMPLE 14

10 g of commercially available γ-alumina pellets (diameter: 1.5 mm, length: 2–3 mm, specific surface area: 260 m$^2$/g) were immersed in an aqueous solution of silver nitrate, and dried at 80° C. for 2 hours in air and 180° C. for 2 hours in dry nitrogen stream. After cooling to room temperature in dry nitrogen stream, the γ-alumina pellets thus obtained were then immersed in an aqueous solution of ammonium chloride (0.5 g ammonium chloride in 20 ml water) for 12 hours to convert the silver nitrate on the γ-alumina pellets into the silver chloride precipitate, thereby obtaining the γ-alumina pellets carrying 4 weight % (metal basis) of silver chloride. The γ-alumina pellets thus obtained were dried and heated to 600° C. stepwise in air to be calcined. The γ-alumina pellets thus obtained were further immersed in an aqueous solution prepared by heating over a water bath a mixture of ammonium molybdate, oxalic acid and water to further carry 0.06 weight % (metal basis) of Mo. The γ-alumina pellets thus treated were subjected to drying and calcination in the same manner as above to obtain a first catalyst (AgCl/Mo).

Separately, 2 g of γ-alumina pellets of the same type as above were immersed in an aqueous solution of chloroplatinic acid to carry 0.2 weight % (metal basis) of Pt. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt).

An exhaust gas cleaner was obtained by charging into a reactor tube 3 g of the first catalyst on the inlet side and 0.6 g of the second catalyst on the outlet side. Next, a test gas having the composition shown in Table 8 was caused to pass through the reactor pipe at a rate of 4.4 liters per minute (the normal state), which corresponded to an overall apparent space velocity of about 30,000 h$^{-1}$. The temperature of the test as in the reactor tube was maintained at a temperature shown in Table 12 to cause a reaction of nitrogen oxides with ethanol.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in Table 12.

EXAMPLE 15

In the same manner as in Example 14, γ-alumina powder (specific surface area: 200 m$^2$/g) carrying 4 weight % (metal basis) of AgCl and 0.06 weight % (metal basis) of Mo was prepared. Then, 1.0 g of the γ-alumina powder thus obtained was coated on a commercially available honeycomb-type cordierite filter (diameter: 30 mm, length: 10 mm, 400 cells/in$^2$), dried and then heated to 600° C. stepwise to calcine the resulting material to prepare a first exhaust gas cleaner part carrying the first catalyst (AgCl/Mo).

Separately, γ-alumina powder of the same type as above was dispersed in an aqueous solution of chloroplatinic acid to obtain a slurry of γ-alumina powder carrying 0.2 weight % (metal basis) of Pt. 0.25 g (dry basis) of the slurry thus obtained was coated on a commercially available honeycomb-type cordietite filter (diameter: 30 mm, length: 2.5 mm). The cordierite filter thus treated was then dried and calcined in the same manner as in Example 14 to prepare a second exhaust gas cleaner part carrying the second catalyst (Pt).

With the first cleaner part on the inlet side and the second cleaner part on the outlet side, the two cleaner parts were combined and charged in a reactor pipe. Under the same conditions as in Example 14, tests were conducted using the test gas having the composition shown in Table 8. The results are shown in Table 12.

Comparitive Example 7

In the same manner as in Example 14, a catalyst comprising γ-alumina pellets carrying 4 weight % (metal basis) of AgCl alone was prepared. 3.6 g of this catalyst was charged in a reactor pipe to obtain an exhaust gas cleaner. The same tests as in Example 4 were conducted on the exhaust gas cleaner thus obtained The results are shown in Table 12.

TABLE 12

| Temp. (°C.) | Removal Ratio of Nitrogen Oxides (%) | | |
|---|---|---|---|
| | Ex. 14 | Ex. 15 | Com. Ex. 7 |
| 250 | 78.2 | 86.5 | 28.3 |
| 300 | 86.5 | 92.0 | 48.2 |
| 350 | 83.0 | 90.2 | 63.2 |
| 400 | 67.3 | 78.2 | 76.5 |
| 450 | 52.3 | 58.6 | 72.2 |
| 500 | 44.8 | 46.2 | 62.2 |
| 550 | 42.2 | 45.6 | 52.3 |

As is clear from Table 12, the exhaust gas cleaners of Examples 14 and 15 showed high removal ratios of the nitrogen oxides over a wide temperature range, in particular, over a lower temperature range of the exhaust gas. On the other hand, the exhaust gas cleaner of Comparative Example 7 which included the Ag component alone showed a lower removal ratio of the nitrogen oxides as compared with those of Examples 14 and 15.

EXAMPLE 16

10 g of commercially available silica-alumina powder ($SiO_2$ content: 5 weight %, specific surface area: 350 $m^2/g$) was dispersed in an aqueous solution of silver nitrate to carry 4 weight % (metal basis) of Ag based on the silica-alumina powder. The resultant powder was then dried and heated to 600° C. stepwise in air to be calcined. The calcined powder was further dispersed for 30 minutes in an aqueous solution prepared by heating over a water bath a mixture of ammonium vanadate, oxalic acid and water to further carry 0.6 weight % (metal basis) of V on the silica-alumina powder. The powder thus treated was formed into pellets (diameter: 1.5 mm, length: 2–3 mm), dried and heated to 600° C. stepwise in air to be calcined to obtain a first catalyst (Ag/V).

Separately, 2 g of titania pellets (diameter: 1.5 mm, length: 2–3 mm, specific surface area: 350 $m^2/g$) were immersed in an aqueous solution of chloroplatinic acid to carry 1 weight % (metal basis) of Pt, then immersed for 30 minutes in an aqueous solution prepared by heating over a water bath a mixture of ammonium vanadate, oxalic acid and water to further carry 3 weight % (metal basis) of V. The titania pellets thus treated were dried in an air at 80° C. for 2 hours, at 100° C. for 2 hours and then at 120° C. for 2 hours. The dried titania pellets were then heated from 120° C. to 500° C. in a nitrogen stream containing 20% of oxygen over 5 hours and calcined at 500° C. for 4 hours to prepare a second catalyst (Pt/V).

An exhaust gas cleaner was obtained by charging into a reactor tube 3.6 g of the first catalyst on the inlet side and 1.2 g of the second catalyst on the outlet side. Next, a test gas having the composition shown in Table 13 was caused to pass through the reactor pipe at a rate of 4.4 liters per minute (the normal state), which corresponded to an apparent space velocity at the first catalyst of about 30,000 $h^{-1}$, and an apparent space velocity at the second catalyst of about 100,000 $h^{-1}$. The temperature of the test gas in the reactor tube was maintained at a temperature shown in Table 14 to cause a reaction of nitrogen oxides with ethanol.

TABLE 13

| Component | Concentration |
|---|---|
| Nitrogen monoxide | 800 ppm (dry basis) |
| Oxygen | 10 volume % (dry basis) |
| Carbon monoxide | 100 ppm (dry basis) |
| Ethanol | three times the weight of nitrogen monoxide (dry basis) |
| Propylene | 100 ppm (dry basis) |
| Sulfur dioxide | 80 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentration of carbon monoxide, sulfur dioxide and hydrocarbon (propylene) were measured by a CO-meter, SOx-meter and HC-meter to determine each removal ratio of carbon monoxide and hydrocarbon and the oxidation ratio of sulfur dioxide. However, the removal ratios of carbon monoxide and hydrocarbon were determined on the test gas containing no ethanol. The results are shown in Table 14.

EXAMPLE 17

In the same manner as in Example 16, silica-alumina powder carrying 4 weight % (metal basis) of Ag and 0.6 weight % (metal basis) of V was prepared. Then, 1.0 g of the silica-alumina powder thus obtained was coated on a commercially available honeycomb-type cordierite filter (diameter: 30 mm, length: 12.5 mm, 400 cells/$in^2$), dried and then heated to 600° C. stepwise to calcine the resulting material to prepare a first exhaust gas cleaner part carrying the first catalyst (Ag/V).

Separately, titania powder (specific surface area: 50 $m^2/g$) was dispersed in an aqueous solution of chloroplatinic acid to carry 1 weight % (metal basis) of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % (metal basis) of W. 0.4 g (dry basis) of the slurry thus obtained was coated on a commercially available honeycomb-type cordierite filter (diameter: 30 mm, length: 2.5 mm). The cordierite filter thus treated was then dried and calcined in the same manner as in Example 16 to prepare a second exhaust gas cleaner part carrying the second catalyst (Pt/W).

With the first cleaner part on the inlet side and the second cleaner part on the outlet side, the two cleaner parts were combined and charged in a reactor pipe. Under the same conditions as in Example 16, tests were conducted using the test gas having the composition shown in Table 13 (apparent space velocity at the first catalyst: about 30,000 h$^{-1}$, apparent space velocity at the second catalyst: about 90,000 h$^{-1}$). The results are shown in Table 14.

EXAMPLE 8

In the same manner as in Example 17, a first exhaust gas cleaner part carrying a first catalyst (Ag/V) was prepared. Further, in the same manner as in Example 17, a second exhaust gas cleaner part carrying a second catalyst (Pt/W/V) was obtained by coating titania powder carrying 1 weight % of Pt, 2 weight % of W and 3 weight % of V, each based on metal basis, on a commercially available honeycomb-type cordierite filter.

With the first cleaner part on the inlet side and the second cleaner part on the outlet side, the two cleaner parts were combined and charged in a reactor pipe. Under the same conditions as in Example 16, tests were conducted using the test gas having the composition shown in Table 13 (apparent space velocity at the first catalyst: about 30,000 h$^{-1}$, apparent space velocity at the second catalyst: about 90,000 h$^{-1}$). The results are shown in Table 14.

EXAMPLE 19

In the same manner as in Example 17, γ-alumina powder (specific surface area: 200 m$^2$/g) carrying 4 weight % (metal basis) of Ag and 0.6 weight % (metal basis) of V was prepared. Then, 1.0 g of the γ-alumina powder thus obtained was coated on a commercially available honeycomb-type cordierite filter (diameter: 30 mm, length: 12.5 mm, 400 cells/in$^2$), dried and then heated to 600° C. stepwise to calcine the resulting material to prepare a first exhaust gas cleaner part carrying the first catalyst (Ag/V).

Separately, in the same manner as in Example 17, a second exhaust gas cleaner part carrying the second catalyst (Pt/W) was prepared.

With the first cleaner part on the inlet side and the second cleaner part on the outlet side, the two cleaner parts were combined and charged in a reactor pipe. Under the same conditions as in Example 16, tests were conducted using the test gas having the composition shown in Table 13 (apparent space velocity at the first catalyst: about 30,000 h$^{-1}$, apparent space velocity at the second catalyst: about 90,000 h$^{-1}$). The results are shown in Table 14.

Comparative Example 8

In the same manner as in Example 16, a catalyst comprising silica-alumina pellets carrying 4 weight % (metal basis) of Ag alone was prepared. 3.6 g of this catalyst was charged in a reactor pipe to obtain an exhaust gas cleaner. Tests were conducted under the same conditions as in Example 16 (overall apparent space velocity: about 30,000 h$^{-1}$). The results are shown in Table 14.

TABLE 14

Removal Ratios of Nitrogen Oxides (NOx), Carbon Monoxide (CO) and Hydrocarbons (HC), and Oxidation Ratio of Sulfur Dioxide (SO$_2$)

| Temperature (°C.) | Removed Components | Removal Ratio and Oxidation Ratio (%) | | | | |
|---|---|---|---|---|---|---|
| | | Ex. 16 | Ex. 17 | Ex. 18 | Ex. 19 | Com. Ex. 8 |
| 250 | NOx | 35 | 30 | 40 | 30 | 12 |
| | CO | 45 | 42 | 38 | 42 | 15 |
| | HC | 30 | 29 | 32 | 48 | 10 |
| | SO$_2$ | — | — | — | — | — |
| 300 | NOx | 60 | 55 | 65 | 62 | 30 |
| | CO | 68 | 65 | 64 | 68 | 40 |
| | HC | 53 | 50 | 59 | 52 | 32 |
| | SO$_2$ | — | — | — | — | — |
| 350 | NOx | 74 | 70 | 78 | 75 | 50 |
| | CO | 85 | 80 | 80 | 82 | 60 |
| | HC | 70 | 70 | 70 | 72 | 32 |
| | SO$_2$ | — | — | — | — | — |
| 400 | NOx | 85 | 88 | 85 | 88 | 60 |
| | CO | 100 | 100 | 100 | 100 | 70 |
| | HC | 95 | 95 | 94 | 96 | 40 |
| | SO$_2$ | 5 | 5 | 5 | 5 | — |
| 450 | NOx | 74 | 76 | 70 | 74 | 70 |
| | CO | 100 | 100 | 100 | 100 | 70 |
| | HC | 98 | 98 | 96 | 98 | 65 |
| | SO$_2$ | 7 | 7 | 7 | 7.8 | — |
| 500 | NOx | 60 | 65 | 63 | 62 | 60.2 |
| | CO | 100 | 100 | 100 | 100 | 80 |
| | HC | 100 | 100 | 100 | 100 | 70 |
| | SO$_2$ | 12 | 12 | 12 | 12.5 | — |
| 550 | NOx | 40 | 44 | 42 | 40 | 52 |
| | CO | 100 | 100 | 100 | 100 | 90 |
| | HC | 100 | 100 | 100 | 100 | 85 |
| | SO$_2$ | 15 | 15 | 15 | 16 | — |
| 600 | NOx | 10 | 20 | 15 | — | 20 |
| | CO | 100 | 100 | 100 | — | 98 |
| | HC | 100 | 100 | 100 | — | 90 |
| | SO$_2$ | 20 | 20 | 20 | 22 | — |

As seen from the Table 14, the exhaust gas cleaners of Examples 16–19 showed high removal ratio of the nitrogen oxides over a wide temperature range as well as high removal ratios of carbon monoxide and hydrocarbons even in a lower temperature range. In addition, the use of alumina-based composite oxide prevented SO$_2$ from being preferentially oxidized. Thus, the exhaust gas cleaners of Examples 16–19 showed removal efficiency superior to that of Comparative Example 8.

EXAMPLE 20

10 g of commercially available γ-alumina pellets (diameter: 1.5 mm, length: 2–3 mm, specific surface area: 260 m$^2$/g) were immersed in an aqueous solution of silver nitrate to carry 4 weight % (metal basis) of Ag based on the γ-alumina pellets. The resultant pellets were dried and heated to 600° C. stepwise in air to be calcined. The calcined pellets were further immersed in an aqueous solution prepared by heating over a water bath a mixture of ammonium molybdate, oxalic acid in water to further carry 0.06 weight % (metal basis) of Mo on the γ-alumina pellets. The pellets thus treated were dried and heated as above to obtain a first catalyst (Ag/Mo).

Separately, 2 g of γ-alumina pellets (diameter: 1.5 mm, length: 2–3 mm, specific surface area: 260 m$^2$/g) were immersed in an aqueous solution of chloroplatinic acid to carry 1 weight % (metal basis) of Pt, and then immersed for 30 minutes in an aqueous solution prepared by heating over a water bath a mixture of ammonium vanadate, oxalic acid and water to further carry 3 weight % (metal basis) of V. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt/V).

An exhaust gas cleaner was obtained by charging into a reactor tube 3.6 g of the first catalyst on the inlet side and 1.2 g of the second catalyst on the outlet side. Next, a test gas having the composition shown in Table 15 was caused to pass through the reactor pipe at a rate of 4.4 liters per minute (the normal state), which corresponded to an apparent space velocity at the first catalyst of about 30,000 $h^{-1}$, and an apparent space velocity at the second catalyst of about 100,000 $h^{-1}$. The temperature of the test gas in the reactor tube was maintained at a temperature shown in Table 16 to cause a reaction of nitrogen oxides with ethanol.

TABLE 15

| Component | Concentration |
|---|---|
| Nitrogen monoxide | 800 ppm (dry basis) |
| Oxygen | 10 volume % (dry basis) |
| Carbon monoxide | 100 ppm (dry basis) |
| Ethanol | three times the weight of nitrogen monoxide (dry basis) |
| Propylene | 100 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentration of carbon monoxide and hydrocarbon (propylene) were measured by a CO-meter and HC-meter to determine the removal ratios of carbon monoxide and hydrocarbon. However, the removal ratios of carbon monoxide and hydrocarbon were determined on the test gas containing no ethanol. The results are shown in Table 16.

EXAMPLE 21

In the same manner as in Example 5, γ-alumina powder (specific surface area: 200 $m^2$/g) carrying 4 weight % (metal basis) of Ag and 0.06 weight % (metal basis) of Mo was prepared. Then, 1.0 g of the γ-alumina powder thus obtained was coated on a commercially available honeycomb-type cordierite filter (diameter: 30 mm, length: 12.5 mm, 400 cells/$in^2$), dried and then heated to 600° C. stepwise to calcine the resulting material to prepare a first exhaust gas cleaner part carrying the first catalyst (Ag/Mo).

Separately, titania powder (specific surface area: 50 $m^2$/g) was dispersed in an aqueous solution of chloroplatinic acid to carry 1 weight % (metal basis) of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % (metal basis) of W. 0.4 g (dry basis) of the slurry thus obtained was coated on a commercially available honeycomb-type cordierite filter (diameter: 30 mm, length: 4.2 mm). The cordierite filter thus treated was then dried and calcined in the same manner as in Example 20 to prepare a second exhaust gas cleaner part carrying the second catalyst (Pt/W).

With the first cleaner part on the inlet side and the second cleaner part on the outlet side, the two cleaner parts were combined and charged in a reactor pipe. Under the same conditions as in Example 20, tests were conducted using the test gas having the composition shown in Table 15 (apparent space velocity at the first catalyst: about 30,000 $h^{-1}$, apparent space velocity at the second catalyst: about 90,000 $h^{-1}$). The results are shown in Table 16.

EXAMPLE 22

In the same manner as in Example 21, a first exhaust gas cleaner part carrying a first catalyst (Ag/Mo) was prepared. Further, in the same manner as in Example 21, a second exhaust gas cleaner part carrying a second catalyst (Pt/W/V) was obtained by coating titania powder carrying 1 weight % of Pt, 1 weight % of W and 2 weight % of V, each based on metal basis, on a commercially available honeycomb-type cordierite filter.

With the first cleaner part on the inlet side and the second cleaner part on the outlet side, the two cleaner parts were combined and charged in a reactor pipe. Under the same conditions as in Example 20, tests were conducted using the test gas having the composition shown in Table 15 (apparent space velocity at the first catalyst: about 30,000 $h^{-1}$, apparent space velocity at the second catalyst: about 90,000 $h^{-1}$). The results are shown in Table 16.

Comparative Example 9

In the same manner as in Example 20, a catalyst comprising γ-alumina pellets carrying 4 weight % (metal basis) of Ag alone was prepared. 3.6 g of this catalyst was charged in a reactor pipe to obtain an exhaust gas cleaner. Tests were conducted under the same conditions as in Example 20 (overall apparent space velocity: about 30,000 $h^{-1}$). The results are shown in Table 16.

TABLE 16

Removal Ratios of Nitrogen Oxides (NOx), Carbon Monoxide (CO) and Hydrocarbons (HC)

| Temperature (°C.) | Removed Components | Removal Ratio (%) | | | |
|---|---|---|---|---|---|
| | | Ex. 20 | Ex. 21 | Ex. 22 | Com. Ex. 9 |
| 200 | NOx | 45 | 40 | 50 | 0 |
| | CO | 35 | 30 | 35 | 10 |
| | HC | 22 | 20 | 20 | 5 |
| 250 | NOx | 70 | 68 | 72 | 30 |
| | CO | 45 | 40 | 40 | 20 |
| | HC | 37 | 35 | 32 | 15 |
| 300 | NOx | 90 | 88 | 92 | 65 |
| | CO | 70 | 70 | 68 | 45 |
| | HC | 60 | 60 | 58 | 37 |
| 350 | NOx | 74 | 75 | 74 | 75 |
| | CO | 80 | 80 | 79 | 65 |
| | HC | 72 | 70 | 70 | 38 |
| 400 | NOx | 65 | 72 | 64 | 80 |
| | CO | 100 | 100 | 100 | 75 |
| | HC | 100 | 100 | 100 | 45 |
| 450 | NOx | 55 | 58 | 52 | 80 |
| | CO | 100 | 100 | 100 | 75 |
| | HC | 100 | 100 | 100 | 70 |
| 500 | NOx | 40 | 42 | 38 | 70 |
| | CO | 100 | 100 | 100 | 85 |
| | HC | 100 | 100 | 100 | 75 |
| 550 | NOx | 30 | 32 | 25 | 40 |
| | CO | 100 | 100 | 100 | 95 |
| | HC | 100 | 100 | 100 | 90 |

As seen from Table 16, the exhaust gas cleaners of Example 20–22 showed high removal ratios of the nitrogen oxides, carbon monoxide and hydrocarbons over a wide temperature range, in particular, high removal ratios even in a temperature range lower than 350° C. Thus, the exhaust gas cleaners of Examples 20–22 showed moval efficiency superior to that of Comparative Example 9.

EXAMPLE 23

10 g of commercially available silica-aluminia powder ($SiO_2$ content: 5 weight %, specific surface area: 350 $m^2g$) was dispersed in an aqueous solution of silver nitrate, and dried at 80° C. for 2 hours in air and 180° C. for 2 hours in dry nitrogen stream. After cooling to room temperature in dry nitrogen stream, the silica-alumina powder thus obtained was then immersed in an aqueous solution of ammonium chloride (0.5 g ammonium chloride in 20 ml water) for 12 hours to convert the silver nitrate on the silica-alumina powder into the silver chloride precipitate, thereby obtaining the silica-alumina powder carrying 4 weight % (metal basis) of AgCl. The resultant powder was then dried and heated to 600° C. stepwise in air to be calcined. The calcined powder was further dispersed for 30 minutes in an aqueous solution prepared by heating over a water bath a mixture of ammonium vanadate, oxalic acid and water to further carry 0.6 weight % (metal basis) of V on the silica-alumina powder. The powder thus treated was formed into pellets (diameter: 1.5 mm, length: 2–3 mm), dried and heated to 600° C. stepwise in air to be calcined to obtain a first catalyst (AgCl/V).

Separately, 2 g of titania pellets (diameter: 1.5 mm, length: 2–3 mm, specific surface area: 350 $m^2/g$) were immersed in an aqueous solution of chloroplatinic acid to carry 1 weight % (metal basis) of Pt, then immersed for 30 minutes in an aqueous solution prepared by heating over a water bath a mixture of ammonium vanadate, oxalic acid and water to further carry 3 weight % (metal basis) of V. The titania pellets thus treated were dried in an air at 80° C. for 2 hours, at 100° C. for 2 hours and then at 120° C. for 2 hours. The dried titania pellets were then heated from 120° C. to 500° C. in a nitrogen stream containing 20% of oxygen over 5 hours and calcined at 500° C. for 4 hours to prepare a second catalyst (Pt/V).

An exhaust gas cleaner was obtained by charging into a reactor tube 3.6 g of the first catalyst on the inlet side and 1.2 g of the second catalyst on the outlet side. Next, a test gas having the composition shown in Table 17 was caused to pass through the reactor pipe at a rate of 4.4 liters per minute (the normal state), which corresponded to an apparent space velocity at the first catalyst of about 30,000 $h^{-1}$, and an apparent space velocity at the second catalyst of about 100,000 $h^{-1}$. The temperature of the test gas in the reactor tube was maintained at a temperature shown in Table 18 to cause a reaction of nitrogen oxides with ethanol.

TABLE 17

| Component | Concentration |
|---|---|
| Nitrogen monoxide | 1000 ppm (dry basis) |
| Carbon dioxide | 10 volume % (dry basis) |
| Oxygen | 10 volume % (dry basis) |
| Ethanol | 1250 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemi- luminescence analyzer to determine the removal ratio of nitrogen oxides. The results are shown in Table 18.

EXAMPLE 24

In the same manner as in Example 23, silica-alumina powder carrying 4 weight % (metal basis) of AgCl and 0.6 weight % (metal basis) of V was prepared. Then, 1.0 g of the silica-alumina powder thus obtained was coated on a commercially available honeycomb-type cordierite filter (diameter: 30 mm, length: 12.5 mm, 400 cells/$in^2$), dried and then heated to 600° C. stepwise to calcine the resulting material to prepare a first exhaust gas cleaner part carrying the first catalyst (AgCl/V).

Separately, titania powder (specific surface area: 50 $m^2/g$) was dispersed in an aqueous solution of chloroplatinic acid to carry 1 weight % (metal basis) of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % (metal basis) of W. 0.4 g (dry basis) of the slurry thus obtained was coated on a commercially available honeycomb-type cordierite filter (diameter: 30 mm, length: 2.5 mm). The cordierite filter thus treated was then dried and calcined in the same manner as in Example 16 to prepare a second exhaust gas cleaner part carrying the second catalyst (Pt/W).

With the first cleaner part on the inlet side and the second cleaner part on the outlet side, the two cleaner parts were combined and charged in a reactor pipe. Under the same conditions as in Example 23, tests were conducted using the test gas having the composition shown in Table 17 (apparent space velocity at the first catalyst: about 30,000 $h^{-1}$, apparent space velocity at the second catalyst: about 90,000 $h^{-1}$). The results are shown in Table 18.

EXAMPLE 25

In the same manner as in Example 23, a first exhaust gas cleaner part carrying a first catalyst (AgCl/V) was prepared. Further, in the same manner as in Example 23, a second exhaust gas cleaner part carrying a second catalyst (Pt/W/V) was obtained by coating titania powder carrying 1 weight % of Pt. 2 weight % of W and 3 weight % of V, each based on metal basis, on a commercially available honeycomb-type cordierite filter.

With the first cleaner part on the inlet side and the second cleaner part on the outlet side, the two cleaner parts were combined and charged in a reactor pipe. Under the same conditions as in Example 23, tests were conducted using the test gas having the composition shown in Table 17 (apparent space velocity at the first catalyst: about 30,000 $h^{-1}$, apparent space velocity at the second catalyst: about 90,000 $h^{-1}$). The results are shown in Table 18.

EXAMPLE 26

In the same manner as in Example 25, γ-alumina powder (specific surface area: 200 $m^2/g$) carrying 4 weight % (metal basis) of AgCl and 0.6 weight % (metal basis) of V was prepared. Then, 1.0 g of the γ-alumina powder thus obtained was coated on a commercially available honeycomb-type cordierite filter (diameter: 30 mm, length: 12.5 mm, 400 cells/$in^2$), dried and then heated to 600° C. stepwise to calcine the resulting material to prepare a first exhaust gas cleaner part carrying the first catalyst (AgCl/V).

Separately, in the same manner as in Example 25, a second exhaust gas cleaner part carrying the second catalyst (Pt/W) was prepared.

With the first cleaner part on the inlet side and the second cleaner part on the outlet side, the two cleaner parts were combined and charged in a reactor pipe. Under the same conditions as in Example 23, tests were conducted using the test gas having the composition shown in Table 17 (apparent space velocity at the first catalyst: about 30,000 h$^{-1}$, apparent space velocity at the second catalyst: about 90,000 h$^{-1}$). The results are shown in Table 18.

Comparative Example 10

In the same manner as in Example 23, a catalyst comparing silica-alumina pellets carrying 4 weight % (metal basis) of AgCl alone was prepared. 3.6 g of this catalyst was charged in a reactor pipe to obtain an exhaust gas cleaner. Tests were conducted under the same conditions as in Example 23 (overall apparent space velocity: about 30,000 h$^{-1}$). The results are shown in Table 18.

TABLE 18

| Temp. (°C.) | Removal Ratio of Nitrogen Oxides (%) | | | | |
| --- | --- | --- | --- | --- | --- |
| | Ex. 23 | Ex. 24 | Ex. 25 | Ex. 26 | Com. Ex. 10 |
| 250 | 32 | 28 | 38 | 28 | 10 |
| 300 | 56 | 53 | 64 | 60 | 28 |
| 350 | 70 | 68 | 76 | 74 | 46 |
| 400 | 84 | 86 | 83 | 86 | 58 |
| 450 | 76 | 78 | 73 | 79 | 73 |
| 500 | 65 | 70 | 68 | 67 | 63 |
| 550 | 45 | 50 | 48 | 45 | 55 |

As is clear from Table 18, the exhaust gas cleaners of Examples 23–26 showed high removal ratios of the nitrogen oxides in a wide temperature range as compared with Comparative Example 10 which included the Ag component alone.

EXAMPLE 27

10 g of commercially available γ-alumina pellets (diameter: 1.5 mm, length: 2–3 mm, specific surface area: 260 m$^2$/g) were immersed in an aqueous solution of silver nitrate to carry 4 weight % (metal basis) of Ag based on the γ-alumina pellets. The γ-alumina pellets thus obtained were further immersed in an aqueous solution of palladium chloride to further carry 0.01 weight % (metal basis) of Pd. The γ-alumina pellets thus treated were dried and heated to 600° C. stepwise in air to be calcined to obtain a first catalyst (Ag/Pd).

Separately, 2 g of γ-alumina pellets of the same type as above were immersed in an aqueous solution of chloroplatinic acid to carry 0.2 weight % (metal basis) of Pt, then immersed for 30 minutes in an aqueous solution prepared by heating over a water bath a mixture of 1.8 g of ammonium tungstate para-pentahydrate, 1.0 g of oxalic acid and 6.2 ml of water to further carry 1 weight % (metal basis) of W. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt/W).

An exhaust gas cleaner was obtained by charging into a reactor tube 3 g of the first catalyst on the inlet side and 0.6 g of the second catalyst on the outlet side. Next, a test gas having the composition shown in Table 19 was caused to pass through the reactor pipe at a rate of 4.4 liters per minute (the normal state), which corresponded to an overall apparent space velocity of about 30,000 h$^{-1}$. The temperature of the test gas in the reactor tube was maintained at a temperature shown in Table 20 to cause a reaction of nitrogen oxides with ethanol.

TABLE 19

| Component | Concentration |
| --- | --- |
| Nitrogen monoxide | 1000 ppm (dry basis) |
| Carbon dioxide | 10 volume % (dry basis) |
| Oxygen | 10 volume % (dry basis) |
| Ethanol | 1250 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in Table 20.

EXAMPLE 28

In the same manner as in Example 27, γ-alumina powder (specific surface area: 200 m$^2$/g) carrying 4 weight % (metal basis) of Ag and 0.01 weight % (metal basis) of Pd was prepared. Then, 1.0 g of the γ-alumina powder thus obtained was coated on a commercially available honeycomb-type cordierite filter (diameter: 30 mm, length: 10 mm, 400 cells/in$^2$), dried and then heated to 600° C. stepwise to calcine the resulting material to prepare a first exhaust gas cleaner part carrying the first catalyst (Ag/Pd).

Separately, γ-alumina powder of the same type as above was immersed in an aqueous solution of chloroplatinic acid to carry 0.2 weight % (metal basis) of Pt. Then, the resulting γ-alumina powder was immersed for 30 minutes in an aqueous solution prepared by heating over a water bath a mixture of ammonium vanadate and oxalic acid in 30 ml of water to prepare a slurry. The content of V based on the γ-alumina powder was 1 weight % (metal basis). 0.25 g (dry basis) of the slurry thus obtained was coated on a commercially available honeycomb-type cordierite filter (diameter: 30 mm, length: 2.5 mm). The cordierite filter thus treated was then dried and calcined in the same manner as in the preparation of the second catalyst of Example 27 to prepare a second exhaust gas cleaner part carrying the second catalyst (Pt/V).

With the first cleaner part on the inlet side and the second cleaner part on the outlet side, the two cleaner parts were combined and charged in a reactor pipe. Under the same conditions as in Example 1, tests were conducted using the test gas having the composition shown in Table 19. The results are shown in Table 20.

Comparative Example 11

In the same manner as in Example 27, a catalyst comprising γ-alumina pellets carrying 4 weight % (metal basis) of Ag alone was prepared. 3.6 g of this catalyst was charged in a reactor pipe to obtain an exhaust gas cleaner. The same tests as in Example 27 were conducted on the exhaust gas cleaner thus obtained. The results are shown in Table 20.

TABLE 20

| Temp. (°C.) | Removal Ratio of Nitrogen Oxides (%) | | |
|---|---|---|---|
| | Ex. 27 | Ex. 28 | Com. Ex. 11 |
| 300 | 76.8 | 80.5 | 50.2 |
| 350 | 90.2 | 96.7 | 65.8 |
| 400 | 90.7 | 97.0 | 75.1 |
| 450 | 87.7 | 94.5 | 70.5 |
| 500 | 72.3 | 85.4 | 60.1 |
| 550 | 60.4 | 64.0 | 50.4 |

As is clear from Table 20, the exhaust gas cleaners of Example 27 and 28 showed high removal ratios of the nitrogen oxides in a wide temperature range of the exhaust gas. On the other hand, the exhaust gas cleaner of Comparative Example 11 which included only the Ag component showed a lower removal ratio of the nitrogen oxides as compared with those of Examples 27 and 28.

EXAMPLE 29

The same exhaust gas cleaner as prepared in Example 27 was evaluated on its removal efficiency by passing through it a test gas having the composition shown in Table 21 which contained propylene the reducing agent. The test was conducted by passing the test gas at a rate of 4.4 liters per minute (the normal state), which corresponded to an overall apparent space velocity of 30,000 $h^{-1}$ exhaust gas temperatures shown in Table 22.

TABLE 21

| Component | Concentration |
|---|---|
| Nitrogen monoxide | 800 ppm (dry basis) |
| Carbon monoxide | 100 ppm (dry basis) |
| Oxygen | 10 volume % (dry basis) |
| Propylene | 1714 ppm (dry basis, three times the weight of nitrogen monoxide) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentrations of carbon monoxide and hydrocarbons were measured by a CO-meter and HC-meter to determine the removal ratio of carbon monoxide and hydrocarbons. The results are shown in Table 22.

EXAMPLE 30

The same exhaust gas cleaner as prepared in Example 28 was evaluated on its removal efficiency in the same manner as in Example 29. The results are shown in Table 22.

Comparative Example 12

The same exhaust gas cleaner as prepared in Comparative Example 11 was evaluated on its removal efficiency in the same manner as in Example 29. The results are shown in Table 22.

TABLE 22

| Temperature (°C.) | Removed Components | Removal Ratios of Nitrogen Oxides (NOx), Carbon Monoxide (CO) and Hydrocarbons (HC) Removal Ratio (%) | | |
|---|---|---|---|---|
| | | Ex. 29 | Ex. 30 | Com. Ex. 12 |
| 300 | NOx | 30 | 33 | 0 |
| | CO | 52 | 52.3 | 40 |
| | HC | 35 | 35 | 30 |
| 350 | NOx | 40 | 45 | 0 |
| | CO | 80 | 82 | 60 |
| | HC | 71 | 76 | 35 |
| 400 | NOx | 60 | 65 | 20 |
| | CO | 100 | 100 | 70 |
| | HC | 96 | 95 | 40 |
| 450 | NOx | 80 | 88 | 60 |
| | CO | 100 | 100 | 70 |
| | HC | 98 | 98 | 65 |
| 500 | NOx | 80 | 90 | 55 |
| | CO | 100 | 100 | 80 |
| | HC | 100 | 100 | 70 |
| 550 | NOx | 55 | 60 | 25 |
| | CO | 100 | 100 | 90 |
| | HC | 100 | 100 | 85 |
| 600 | NOx | 20 | 25 | 10 |
| | CO | 100 | 100 | 98 |
| | HC | 100 | 100 | 90 |

As is clear from Table 22, the exhaust gas cleaners of Examples 29 and 30 showed high removal ratios of nitrogen oxides and hydrocarbons in a wide temperature range of the exhaust gas. In addition, the exhaust gas cleaners of Examples 29 and 30 showed an excellent removal ratio of carbon monoxide higher than 90%. On the other hand, the exhaust gas cleaner of Comparative Example 12 which included only the Ag component was effective for removal of nitrogen oxides in only a narrow temperature range of the exhaust gas, and showed poor removal ratios of carbon monoxide and hydrocarbons.

EXAMPLE 31

10 g of commercially available silica-alumina powder ($SIO_2$ content: 5 weight %, specific surface area: 350 $m^2/g$) was dispersed in an aqueous solution of silver nitrate to carry 4 weight % (metal basis) of Ag based on the silica-alumina powder. The silica-alumina powder was further dispersed in an aqueous solution of chloroplatinic acid to further carry 0.01 weight % (metal basis) of Pt. The resultant powder was then dried and heated to 600° C. stepwise in air to be calcined. The powder thus treated was formed into pellets (diameter: 1.5 mm, length: 2–3 mm) to obtain a first catalyst (Ag/Pt).

Separately, 2 g of titania pellets (diameter: 1.5 mm, length: 2–3 mm, specific surface area: 350 $m^2/g$) were immersed in an aqueous solution of chloroplatinic acid to carry 1 weight % (metal basis) of Pt, then immersed for 30 minutes in an aqueous solution prepared by heating over a water bath a mixture of ammonium vanadate, oxalic acid and water to carry 3 weight % (metal basis) of V. The titania pellets thus treated were dried in an air at 80° C. for 2 hours, at 100° C. for 2 hours and then at 120° C. for 2 hours. The dried titania pellets were then heated from 120° C. to 500° C. in a nitrogen stream containing 20% of oxygen over 5 hours and calcined at 500° C. for 4 hours to prepare a second catalyst (Pt/V).

An exhaust gas cleaner was obtained by charging into a reactor tube 3.6 g of the first catalyst on the inlet side and 1.2 g of the second catalyst on the outlet side. Next, a test gas having the composition shown in Table 23 was caused to pass through the reactor pipe at a rate of 4.4 liters per minute (the normal state), which corresponded to an apparent space velocity at the first catalyst of about 30,000 $h^{-1}$, and an apparent space velocity at the second catalyst of about 100,000 $h^{-1}$. The temperature of the test gas in the reactor tube was maintained at a temperature shown in Table 24 to cause a reaction of nitrogen oxides with ethanol.

TABLE 23

| Component | Concentration |
|---|---|
| Nitrogen monoxide | 800 ppm (dry basis) |
| Oxygen | 10 volume % (dry basis) |
| Carbon monoxide | 100 ppm (dry basis) |
| Ethanol | three times the weight of nitrogen monoxide (dry basis) |
| Propylene | 100 ppm (dry basis) |
| Sulfur dioxide | 80 ppm (dry basis) |
| Nitrogen | Balance |
| Water | 10 volume % of the total volume of the above components |

The concentration to nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentration of carbon monoxide, sulfur dioxide and hydrocarbon (propylene) were measured by a CO-meter, SOx-meter and HC-meter to determine each removal ratio of carbon monoxide and hydrocarbon and the oxidation ratio of sulfur dioxide. However, the removal ratios of carbon monoxide and hydrocarbon were determined on the test gas containing no ethanol. The results are shown in Table 24.

EXAMPLE 32

In the same manner as in Example 31, silica-alumina powder carrying 4 weight % (metal basis) of Ag and 0.01 weight % (metal basis) of Pt was prepared. Then, 1.0 g of the silica-alumina powder thus obtained was coated on a commercially available honeycomb-type cordierite filter (diameter: 30 mm, length: 12.5 mm, 400 cells/$in^2$), dried and then heated to 600° C. stepwise to calcine the resulting material to prepare a first exhaust gas cleaner part carrying the first catalyst (Ag/Pt).

Separately, titania powder (specific surface area: 50 $m^2/g$) was dispersed in an aqueous solution of chloroplatinic acid to carry 1 weight % (metal basis) of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % (metal basis) of W. 0.4 g (dry basis) of the slurry thus obtained was coated on a commercially available honeycomb-type cordierite filter (diameter: 30 mm, length: 4.2 mm). The cordierite filter thus treated was then dried and calcined in the same manner as in Example 31 to prepare a second exhaust gas cleaner part carrying the second catalyst (Pt/W).

With the first cleaner part on the inlet side and the second cleaner part on the outlet side, the two cleaner parts were combined and charged in a reactor pipe. Under the same conditions as in Example 31, tests were conducted using the test gas having the composition shown in Table 23 (apparent space velocity at the first catalyst: about 30,000 $h^{-1}$, apparent space velocity at the second catalyst: about 90,000 $h^{-1}$). The results are shown in Table 24.

EXAMPLE 33

In the same manner as in Example 32, a first exhaust gas cleaner part carrying a first catalyst (Ag/Pt) was prepared. Further, in the same manner as in Example 32, a second exhaust gas cleaner part carrying a second catalyst (Pt/W/V) was obtained by coating titania powder carrying 1 weight % of Pt, 2 weight % of W and 3 weight % of V, each based on metal basis, on a commercially available honeycomb-type cordierite filter.

With the first cleaner part on the inlet side and the second cleaner part on the outlet side, the two cleaner parts were combined and charged in a reactor pipe. Under the same conditions as in Example 31, tests were conducted using the test gas having the composition shown in Table 23 (apparent space velocity at the first catalyst: about 30,000 $h^{-1}$, apparent space velocity at the second catalyst: about 90,000 $h^{-1}$). The results are shown in Table 24.

Comparitive Example 13

In the same manner as in Example 31, a catalyst comprising g silica-alumina pellets carrying 4 weight % (metal basis) of Ag alone was prepared. 3.6 g of this catalyst was charged in a reactor pipe to obtain an exhaust gas cleaner. Tests were conducted under the same conditions as in Example 31 (overall apparent space velocity: about 30,000 $h^{-1}$). The results are shown in Table 24.

TABLE 24

Removal Ratios of Nitrogen Oxides (NOx), Carbon Monoxide (CO) and Hydrocarbons (HC), and Oxidation Ratio of Sulfur Dioxide ($SO_2$)

| Temperature | Removed | Removal Ratio and Oxidation Ratio (%) | | | |
|---|---|---|---|---|---|
| (°C.) | Components | Ex. 31 | Ex. 32 | Ex. 33 | Com. Ex. 13 |
| 250 | NOx | 20 | 18 | 24 | 12 |
| | CO | 40 | 38 | 40 | 15 |
| | HC | 30 | 28 | 31 | 10 |
| | $SO_2$ | — | — | — | — |
| 300 | NOx | 55 | 50 | 58 | 30 |
| | CO | 50 | 48 | 46 | 40 |
| | HC | 40 | 38 | 40 | 32 |
| | $SO_2$ | — | — | — | — |
| 350 | NOx | 75 | 70 | 78 | 50 |
| | CO | 70 | 68 | 68 | 60 |
| | HC | 45 | 45 | 42 | 32 |
| | $SO_2$ | — | — | — | — |
| 400 | NOx | 84 | 85 | 80 | 60 |
| | CO | 100 | 100 | 100 | 70 |
| | HC | 95 | 96 | 95 | 40 |
| | $SO_2$ | 5 | 5 | 5 | — |
| 450 | NOx | 75 | 78 | 72 | 70 |
| | CO | 100 | 100 | 100 | 70 |
| | HC | 98 | 98 | 98 | 65 |
| | $SO_2$ | 7 | 7 | 7 | — |
| 500 | NOx | 70 | 72 | 71 | 60.2 |
| | CO | 100 | 100 | 100 | 80 |
| | HC | 100 | 100 | 100 | 70 |
| | $SO_2$ | 12 | 12 | 12 | — |
| 550 | NOx | 50 | 52 | 50 | 52 |
| | CO | 100 | 100 | 100 | 90 |
| | HC | 100 | 100 | 100 | 85 |
| | $SO_2$ | 15 | 15 | 15 | — |
| 600 | NOx | 10 | 20 | 15 | 20 |
| | CO | 100 | 100 | 100 | 98 |
| | HC | 100 | 100 | 100 | 90 |
| | $SO_2$ | 20 | 20 | 20 | — |

As seen from Table 24, the exhaust gas cleaners of Examples 31–33 showed high removal ratio of the nitrogen oxides over a wide temperature range as well as high removal ratios of carbon monoxide and hydrocarbons even in a lower temperature range. In addition, the use of an alumina-based composite oxide prevented $SO_2$ from being preferentially oxidized. Thus, the exhaust gas cleaners of Examples 31–33 showed removal efficiency superior to that of Comparative Example 13.

EXAMPLE 34

10 g of commercially available γ-alumina pellets (diameter: 1.5 mm, length: 2–3 mm, specific surface area: 260 m²/g) were immersed in an aqueous solution of silver nitrate to carry 4 weight % (metal basis) of Ag based on the γ-alumina pellets. The γ-alumina pellets were further immersed in an aqueous solution of palladium chloride to further carry 0.01 weight % (metal basis) of Pd. The resultant pellets were dried and heated to 600° C. stepwise in air to be calcined to obtain a first catalyst (Ag/Pd).

Separately, 2 g, of γ-alumina pellets (diameter: 1.5 mm, length: 2–3 mm, specific surface area: 260 m²/g) were immersed in an aqueous solution of chloroplatinic acid to carry 1 weight % (metal basis) of Pt, and then immersed for 30 minutes in an aqueous solution prepared by heating over a water bath a mixture of ammonium vanadate, oxalic acid and water to further carry 3 weight % (metal basis) of V. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt/V).

An exhaust gas cleaner was obtained by charging into a reactor tube 3.6 g of the first catalyst on the inlet side and 1.2 g of the second catalyst on the outlet side. Next, a test gas having the composition shown in Table 25 was caused to pass through the reactor pipe at a rate of 4.4 liters per minute (the normal state), which corresponded to an apparent space velocity at the first catalyst of about 30.000 h⁻¹, and an apparent space velocity at the second catalyst of about 100,000 h⁻¹. The temperature of the test gas in the reactor tube was maintained at a temperature shown in Table 26 to cause a reaction of nitrogen oxides with ethanol.

TABLE 25

| Component | Concentration |
| --- | --- |
| Nitrogen monoxide | 800 ppm (dry basis) |
| Oxygen | 10 volume % (dry basis) |
| Carbon monoxide | 100 ppm (dry basis) |
| Ethanol | three times the weight of nitrogen monoxide (dry basis) |
| Propylene | 100 ppm (dry basis) |
| Nitrogen | Balance |
| Water | 10 volume % of the total volume of the above components |

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. Similarly, the concentration of carbon monoxide and hydrocarbon (propylene) were measured by a CO-meter and HC-meter to determine the removal ratios of carbon monoxide and hydrocarbon. However, the removal ratios of carbon monoxide and hydrocarbon were determined on the test gas containing no ethanol. The results are shown in Table 26.

EXAMPLE 35

In the same manner as in Example 34, γ-alumina powder (specific surface area: 200 m²/g) carrying 4 weight % (metal basis) of Ag and 0.01 weight % (metal basis) of Pt was prepared. Then, 1.0 g of the γ-alumina powder thus obtained was coated on a commercially available honeycomb-type cordierite filter (diameter: 30 mm, length: 12.5 mm, 400 cells/in²), dried and then heated to 600° C. stepwise to calcine the resulting material to prepare a first exhaust gas cleaner part carrying the first catalyst (Ag/Pt).

Separately, titania powder (specific surface area: 50 m²/g) was dispersed in an aqueous solution of chloroplatinic acid to carry 1 weight % (metal basis) of Pt. Then, the resulting titania powder was further dispersed for 30 minutes in an aqueous solution prepared by heating over a water bath a mixture of ammonium tungstate para-pentahydrate and oxalic acid in water to prepare a slurry of titania powder further carrying 3 weight % (metal basis) of W. 0.4 g (dry basis) of the slurry thus obtained was coated on a commercially available honeycomb-type cordierite filter (diameter: 30 mm, length: 4.2 mm). The cordierite filter thus treated was then dried and calcined in the same manner as in Example 34 to prepare a second exhaust gas cleaner part carrying the second catalyst (Pt/W).

With the first cleaner part on the inlet side and the second cleaner part on the outlet side, the two cleaner parts were combined and charged in a reactor pipe. Under the same conditions as in Example 8, tests were conducted using the test gas having the composition shown in Table 25 (apparent space velocity at the first catalyst: about 30,000 h⁻¹, apparent space velocity at the second catalyst: about 90,000 h⁻¹). The results are shown in Table 26.

EXAMPLE 36

In the same manner as in Example 35, a first exhaust gas cleaner part carrying a first catalyst (Ag/Pt) was prepared. Further, in the same manner as in Example 35, a second exhaust gas cleaner part carrying a second catalyst (Pt/W/V) was obtained by coating titania powder carrying 1 weight % of Pt, 1 weight % of W and 2 weight % of V, each based on metal basis, on a commercially available honeycomb-type cordierite filter.

With the first cleaner part on the inlet side and the second cleaner part on the outlet side, the two cleaner parts were combined and charged in a reactor pipe. Under the same conditions as in Example 34, tests were conducted using the test gas having the composition shown in Table 25 (apparent space velocity at the first catalyst: about 30,000 h⁻¹, apparent space velocity at the second catalyst: about 90,000 h⁻¹). The results are shown in Table 26.

Comparative Example 14

In the same manner as in Example 34, a catalyst comprising γ-alumina pellets carrying 4 weight % (metal basis) of Ag alone was prepared. 3.6 g of this catalyst was charged in a reactor pipe to obtain in exhaust gas cleaner. Tests were conducted under the same conditions as in Example 34 (overall apparent space velocity: about 30,000 h³¹ ¹). The results are shown in Table 26.

TABLE 26

Removal Ratios of Nitrogen Oxides (NOx),
Carbon Monoxide (CO) and Hydrocarbons (HC)

| Temperature (°C.) | Removed Components | Removal Ratio (%) | | | |
|---|---|---|---|---|---|
| | | Ex. 34 | Ex. 35 | Ex. 36 | Com. Ex. 14 |
| 250 | NOx | 50 | 55 | 58 | 30 |
| | CO | 50 | 45 | 40 | 20 |
| | HC | 40 | 36 | 32 | 15 |
| 300 | NOx | 77 | 80 | 82 | 50.2 |
| | CO | 70 | 72 | 70 | 45 |
| | HC | 60 | 60 | 58 | 37 |
| 350 | NOx | 82 | 96 | 98 | 65.8 |
| | CO | 90 | 90 | 88 | 65 |
| | HC | 80 | 80 | 75 | 38 |
| 400 | NOx | 90 | 98 | 95 | 75.2 |
| | CO | 100 | 100 | 100 | 75 |
| | HC | 100 | 100 | 100 | 46 |
| 450 | NOx | 88 | 95 | 93 | 70.3 |
| | CO | 100 | 100 | 100 | 75 |
| | HC | 100 | 100 | 100 | 70 |
| 500 | NOx | 73 | 87 | 80 | 60.5 |
| | CO | 100 | 100 | 100 | 85 |
| | HC | 100 | 100 | 100 | 75 |
| 550 | NOx | 60.5 | 65 | 60 | 50.5 |
| | CO | 100 | 100 | 100 | 95 |
| | HC | 100 | 100 | 100 | 75 |

As seen from Table 26, in cleaning of an exhaust gas containing no sulfur oxides, the exhaust gas cleaners of Examples 34–36 showed high removal ratios of the nitrogen oxides, carbon monoxide and hydrocarbons in a wide temperature range. Thus, the exhaust gas cleaners of Examples 34–36 showed removal efficiency superior to that of Comparative Example 14.

EXAMPLE 37

10 g of commercially available γ-alumina pellets (diameter: 1.5 mm, length: 2–3 mm, specific surface area: 260 m²/g) were immersed in an aqueous solution of silver nitrate, and dried at 80° C. for 2 hours in air and 180° C. for 2 hours in dry nitrogen stream. After cooling to room temperature in dry nitrogen stream, the γ-alumina pellets thus obtained were then immersed in an aqueous solution of ammonium chloride (0.5 g ammonium chloride in 20 ml water) for 12 hours to convert the silver nitrate on the γ-alumina pellets into the silver chloride precipitate, thereby obtaining the γ-alumina pellets carrying 4 weight % (metal basis) of silver chloride. The γ-alumina pellets thus obtained were further immersed in an aqueous solution of palladium chloride to further carry 0.01 weight % (metal basis) of Pd. The γ-alumina pellets thus treated were dried and heated to 600° C. stepwise in air to be calcined to obtain a first catalyst (AgCl/Pd).

Separately, 2 g of γ-alumina pellets of the same type as above were immersed in an aqueous solution of chloroplatinic acid to carry 0.2 weight % (metal basis) of Pt, then immersed for 30 minutes in an aqueous solution prepared by heating over a water bath a mixture of 1.8 g of ammonium tungstate para-pentahydrate, 1.0 g of oxalic acid and 6.2 ml of water to further carry 1 weight % (metal basis) of W. The γ-alumina pellets thus treated were dried in an air at 80° C. for 2 hours, at 100° C. for 2 hours and then at 120° C. for 2 hours. The dried γ-alumina pellets were then heated from 120° C. to 500° C. in a nitrogen stream containing 20% of oxygen over 5 hours and calcined at 500° C. for 4 hours to prepare a second catalyst (Pt/W).

An exhaust gas cleaner was obtained by charging into a reactor tube 3 g of the first catalyst on the inlet side and 0.6 g of the second catalyst on the outlet side. Next, a test gas having the composition shown in Table 19 was caused to pass through the reactor pipe at a rate of 4.4 liters per minute (the normal state), which corresponded to an overall apparent space velocity of about 30,000 h⁻¹. The temperature of the test gas in the reactor tube was maintained at a temperature shown in Table 27 to cause a reaction of nitrogen oxides with ethanol.

The concentration of nitrogen oxides (sum of nitrogen monoxide and nitrogen dioxide) in the test gas after passing through the exhaust gas cleaner was measured by a chemiluminescence analyzer to determine the removal ratio of nitrogen oxides. The results are shown in Table 27.

EXAMPLE 38

In the same manner as in Example 37, γ-alumina powder (specific surface area: 200 m²/g) carrying 4 weight % (metal basis) of AgCl and 0.01 weight % (metal basis) of Pd was prepared. Then, 1.0 g of the γ-alumina powder thus obtained was coated on a commercially available honeycomb-type cordierite filter (diameter: 30 mm, length: 10 mm, 400 cells/in²), dried and then heated to 600° C. stepwise to calcine the resulting material to prepare a first exhaust gas cleaner part carrying the first catalyst (AgCl/Pd).

Separately, γ-alumina powder of the same type as above was immersed in an aqueous solution of chloroplatinic acid to carry 0.2 weight % (metal basis) of Pt. Then, the resulting γ-alumina powder was immersed for 30 minutes in an aqueous solution prepared by heating over a water bath a mixture of ammonium vanadate and oxalic acid in 30 ml of water to prepare a slurry. The content of V based on the γ-alumina powder was 1 weight % (metal basis). 0.25 g (dry basis) of the slurry thus obtained was coated on a commercially available honeycomb-type cordierite filter (diameter: 30 mm, length: 2.5 mm). The cordierite filter thus treated was then dried and calcined in the same manner as in the preparation of the second catalyst of Example 37 to prepare a second exhaust gas cleaner part carrying the second catalyst (Pt/V).

With the first cleaner part on the inlet side and the second cleaner part on the outlet side, the two cleaner parts were combined and charged in a reactor pipe. Under the same conditions as in Example 37, tests were conducted using the test gas having the composition shown in Table 19. The results are shown in Table 27.

Comparative Example 15

In the same manner as in Example 37, a catalyst comprising γ-alumina pellets carrying 4 weight % (metal basis) of AgCl alone was prepared. 3.6 g of this catalyst was charged in a reactor pipe to obtain an exhaust gas cleaner. The same tests as in Example 37 were conducted on the exhaust gas cleaner thus obtained. The results are shown in Table 27.

TABLE 27

| | Removal Ratio of Nitrogen Oxides (%) | | |
|---|---|---|---|
| Temp. (°C.) | Ex. 37 | Ex. 38 | Com. Ex. 15 |
| 300 | 75.2 | 78.8 | 48.3 |
| 350 | 88.4 | 94.8 | 63.2 |
| 400 | 88.9 | 96.2 | 74.8 |
| 450 | 89.3 | 96.4 | 75.3 |
| 500 | 75.4 | 88.2 | 65.6 |
| 550 | 64.3 | 68.3 | 55.7 |

As is clear from Table 27, the exhaust gas cleaners of Example 37 and 38 showed high removal ratios of the nitrogen oxides wide temperature range of the exhaust gas.

On the other hand, the exhaust gas cleaner of Comparative Example 15 which included only the Ag component showed a lower removal ratio of the nitrogen oxides as compared with those of Examples 37 and 38.

What is claimed is:

1. An exhaust gas cleaner for removing nitrogen oxides by reduction and unburned components of carbon monoxide and hydrocarbons by oxidation from an exhaust gas discharged from a stationary combustion apparatus, gasoline engine or diesel engine and containing nitrogen oxides and oxygen in an amount greater than the stoichiometric amount or oxygen required for completely oxidizing said unburned components in said exhaust gas, wherein said exhaust gas cleaner consists essentially of:

(a) a first catalyst disposed on an inlet side of said exhaust gas cleaner, said first catalyst consisting essentially of a first porous inorganic oxide supporting 0.2–15 weight % of at least one silver component selected from the group consisting of Ag and compounds thereof and 0.01–2 weight % of at least one base metal component selected from the group consisting of W, V, Mn, and Mo, each weight percentage being expressed on the basis of the base metal; and (b) a second catalyst disposed on an outlet side of said exhaust gas cleaner, said second catalyst consisting essentially of a second porous inorganic oxide supporting 0.01–5 weight % of at least one noble metal component selected from the group consisting of Pt, Pd, Ru, Rh, Ir, and Au, the weight percentage expressed on the basis of the noble metal;

said first porous inorganic oxide being at least one ceramic selected from the group consisting of alumina and alumina-based composite oxides containing at least one of silica, titania, and zirconia and having an alumina content of 50 weight % or more; and said second porous inorganic oxide being at least one ceramic selected from the group consisting of titania, alumina, zirconia, silica, and composite oxides thereof.

2. The exhaust gas cleaner according to claim 1, wherein said first catalyst and said second catalyst are coated onto a ceramic substrate or onto a metal substrate.

3. The exhaust gas cleaner according to claim 1, wherein said first porous inorganic oxide and said second porous inorganic oxide are in the form of pellets or granules.

4. An exhaust gas cleaner for removing nitrogen oxides by reduction and unburned components of carbon monoxide and hydrocarbons by oxidation from an exhaust gas discharged from a stationary combustion apparatus, gasoline engine or diesel engine and containing nitrogen oxides and oxygen in an amount greater than the stoichiometric amount of oxygen required for completely oxidizing said unburned components in said exhaust gas, wherein said exhaust gas cleaner consists essentially of:

(a) a first catalyst disposed on an inlet side of said exhaust gas cleaner, said first catalyst consisting essentially of a first porous inorganic oxide supporting 0.2–15 weight % of at least one silver component selected from the group consisting of Ag and compounds thereof and 0.01–5 weight % of at least one base metal component selected from the group consisting of W, V, Mn, Nb, and Ta, each weight percentage being expressed on the basis of the base metal; and, (b) a second catalyst disposed on an outlet side of said exhaust as cleaner, said second catalyst consisting essentially of a second porous inorganic oxide supporting 0.01–5 weight % of at least one noble metal component selected from the group consisting of Pt, Pd, Ru, Rh, Ir, and Au and 0.01–10 weight % of at least one base metal component selected from the group consisting of W, V, Mn, Mo, Nb, and Ta, each weight percentage being expressed on the basis of the noble metal for the noble metal component and the base metal for the base metal component of the second catalyst;

said first porous inorganic oxide being at least one ceramic selected from the group consisting of alumina and alumina-based composite oxides containing at least one of silica, titania, and zirconia and having an alumina content of 50 weight % or more; and said second porous inorganic oxide being at least one ceramic selected from the group consisting of titania, alumina, zirconia, silica, and composite oxides thereof.

5. The exhaust gas cleaner according to claim 4, wherein said first catalyst and said second catalyst are coated onto a ceramic substrate or a metal substrate.

6. The exhaust gas cleaner according to claim 4, wherein said first porous inorganic oxide and said second porous inorganic oxide are in the form of pellets or granules.

* * * * *